(12) United States Patent
Mishima

(10) Patent No.: US 9,956,826 B2
(45) Date of Patent: May 1, 2018

(54) TIRE

(71) Applicant: BRIDGESTONE CORPORATION, Chuo-ku, Tokyo (JP)

(72) Inventor: Sayaka Mishima, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 817 days.

(21) Appl. No.: 14/372,797

(22) PCT Filed: Jan. 25, 2013

(86) PCT No.: PCT/JP2013/051670
§ 371 (c)(1),
(2) Date: Jul. 17, 2014

(87) PCT Pub. No.: WO2013/111890
PCT Pub. Date: Aug. 1, 2013

(65) Prior Publication Data
US 2015/0000814 A1   Jan. 1, 2015

(30) Foreign Application Priority Data
Jan. 27, 2012  (JP) ................................. 2012-015463

(51) Int. Cl.
B60C 13/00 (2006.01)
B60C 13/02 (2006.01)
B60C 15/024 (2006.01)

(52) U.S. Cl.
CPC ............ *B60C 13/02* (2013.01); *B60C 15/024* (2013.01)

(58) Field of Classification Search
CPC ........ B60C 13/00; B60C 13/001; B60C 13/02
See application file for complete search history.

(56) References Cited

U.S. PATENT DOCUMENTS 5,645,661 A * 7/1997 Clementz ............. B60C 13/001
  152/523
2008/0283169 A1* 11/2008 Sato .................... B29D 30/0606
  152/450

(Continued)

FOREIGN PATENT DOCUMENTS

EP        1106396     *  6/2001
JP        03-186409 A    8/1991
(Continued)

OTHER PUBLICATIONS

International Search Report of PCT/JP2013/051670 dated Apr. 9, 2013.

(Continued)

*Primary Examiner* — Justin R Fischer
(74) *Attorney, Agent, or Firm* — Sughrue Mion, PLLC

(57) ABSTRACT

A circumferential recess is formed on the outer surface of a tire side section, the circumferential recess being recessed inward in a tread width direction and extending in a tire circumferential direction. A block protruding outward in the tread width direction is formed on the inside of the circumferential recess. In a cross section along the tread width direction of the tire and the tire radial direction, a rim outer surface is formed in an area from a rim separation point, which is the outermost point in the tire radial direction that is in contact with a rim flange, to an inner end of the circumferential recess in the tire radial direction. At least a part of the block protrudes further to the outside in the tread width direction than a virtual line along which the rim outer surface extends.

16 Claims, 16 Drawing Sheets

(56) References Cited

U.S. PATENT DOCUMENTS

| | | |
|---|---|---|
| 2009/0032161 A1 | 2/2009 | Yamaguchi |
| 2010/0180994 A1 | 7/2010 | Yamaguchi |
| 2010/0193102 A1 | 8/2010 | Tsuruta et al. |

FOREIGN PATENT DOCUMENTS

| | | | |
|---|---|---|---|
| JP | 04-151309 A | | 5/1992 |
| JP | 5-139123 | * | 6/1993 |
| JP | 10-193924 A | | 7/1998 |
| JP | 2000-158919 A | | 6/2000 |
| JP | 2009-029381 A | | 2/2009 |
| JP | 2009-073369 A | | 4/2009 |
| JP | 2009-083769 A | | 4/2009 |
| JP | 2009-160990 A | | 7/2009 |
| JP | 2011-246122 A | | 12/2011 |
| RU | 2409478 C1 | | 1/2011 |
| WO | 2009/084634 A1 | | 7/2009 |

OTHER PUBLICATIONS

Office Action of JP 2012-015463 dated Jan. 7, 2014.
Communication dated Jan. 15, 2016 from the Russian Patent Office in counterpart application No. 2014134855/11.

* cited by examiner (a)

(b)

(a)

(b)

(a)

(b)

(a)

(b)

(a)

(b)

(a)

(b)

(c)

(d)

(e)

TIRE

CROSS REFERENCE TO RELATED APPLICATIONS

This is a National Stage of International Application No. PCT/JP2013/051670 filed Jan. 25, 2013, claiming priority based on Japanese Patent Application No. 2012-015463 filed Jan. 27, 2012, the contents of all of which are incorporated herein by reference in their entirety.

TECHNICAL FIELD

The present invention relates to a tire including a tread section that comes into contact with a road surface and a tire side section that is continuous with the tread section.

BACKGROUND ART

In a tire mounted on a vehicle, heat generated during rotation of the tire has heretofore been a problem. An increase in temperature of the tire due to heat generation leads to acceleration of change over time such as changes in physical properties of a tire material, breakage of a tread during high-speed driving, and the like. Particularly, in an off-the-road radial (ORR) tire and a truck bus radial (TBR) tire, friction with a rim flange and upthrust from the rim flange deforms rubber in a tire side section, particularly, on a bead section side, and thus heat is more likely to be generated. Heat generated in the tire side section accelerates deterioration of the rubber, leading to deterioration in not only durability of the bead section but also durability of the tire. There has been a demand for a tire capable of suppressing an increase in temperature on the bead section side of the tire side section.

In a tire described in Patent Literature 1, for example, a turbulence generation protrusion is formed along a tire radial direction within a predetermined range of a tire side section, as means for suppressing an increase in temperature of a bead section. Thus, turbulence having a high flow rate is generated on a surface of a tire to facilitate heat release from the tire side section, thereby suppressing the increase in temperature on the bead section side.

Incidentally, the conventional tire described above has the following problem. Specifically, a method including formation of protrusions in the tire side section increases the volume of rubber in the tire side section. As a result, heat is more likely to be generated due to an increase in deformation amount of the rubber during rotation of the tire. In other words, the effect of suppressing temperature increase by facilitating heat release with formation of protrusions is deteriorated. Moreover, since rubber is required to form the protrusions, an increase in amount of rubber required for a pneumatic tire increases production cost. For these reasons, further improvement has been desired for the tire suppressing the increase in temperature of the tire side section, particularly on the bead section side.

CITATION LIST

Patent Literature

[PTL 1] WO 2009/084634

SUMMARY OF INVENTION

An aspect of the present invention is a tire (pneumatic tire 1) including a tread section (tread section 10) coming into contact with a road surface and a tire side section (tire side section 20) continuous with the tread section, wherein a circumferential recess (circumferential recess 100) is formed on an outer surface of the tire side section, the circumferential recess being depressed inward in a tread width direction and extending in a tire circumferential direction, a block (e.g., a first block 111) protruding outward in the tread width direction is formed on the inside of the circumferential recess, in a cross section along the tread width direction of the tire and a tire radial direction, a rim outer surface (rim-side outer surface 80) is formed in an area from a rim separation point (rim separation point 61a), which is the outermost point in the tire radial direction that is in contact with a rim flange (rim flange 61), to an inner end (end 100a) of the circumferential recess in the tire radial direction, and at least a part of the block protrudes further to the outside in the tread width direction than a virtual line along which the rim outer surface extends.

In the above tire, the circumferential recess depressed inward in the tread width direction and extending in the tire circumferential direction is formed on the outer surface of the tire side section. According to the above tire, a distance between a high-temperature section inside of the tire (particularly, inside of the bead section) and a heat release surface (outer surface of the circumferential recess) can be reduced by forming the circumferential recess. Thus, an effect of suppressing an increase in temperature of the rubber can be enhanced. Furthermore, according to the above tire, cost reduction can be achieved by reduction in weight, compared with the case where no circumferential recess is formed.

Moreover, the blocks protruding outward in the tread width direction are formed on the inside of the circumferential recess. Here, if the blocks are arranged in the tire side section without providing the circumferential recess, a sufficient effect of suppressing the increase in temperature of the rubber cannot be achieved due to a too large gauge thickness. By arranging the blocks on the inside of the circumferential recess, the effect of suppressing the increase in temperature of the rubber can be sufficiently enhanced.

Furthermore, in the above tire, a part of the block is formed so as to protrude further to the outside in the tread width direction than the virtual line along which the rim outer surface extends. According to the tire as described above, air flowing along the outer surface of the tire side section is likely to be drawn into the circumferential recess from a part of the block. In other words, the increase in temperature of the rubber can be further suppressed by increasing the amount of air flowing into the circumferential recess.

As described above, the above tire can suppress the increase in temperature of the rubber in the tire side section, particularly in the bead section, while reducing production cost.

Another aspect of the present invention is that a protrusion height of the block with respect to the virtual line in the tread width direction is within a range of 1 to 25 mm.

Another aspect of the present invention is that the block is positioned at the inner end of the circumferential recess in the tire radial direction.

Another aspect of the present invention is that the rim outer surface is formed along a predetermined arc curve having a center of a curvature radius on the inside in the tread width direction, and the virtual line is a line drawn to extend the predetermined arc curve to the circumferential recess.

Another aspect of the present invention is that in the cross section along the tread width direction of the tire and the tire radial direction, a sidewall surface formed in a range from the inner end of the circumferential recess in the tire radial direction to a bottom surface of the circumferential recess is formed along another arc curve having a center of a curvature radius on the outside in the tread width direction, and when a tire height in the tire radial direction in a no-load state with a normal inner pressure and no load applied is H, the sidewall surface in a normal-load state with the normal inner pressure and a normal load applied is positioned within a range of 25% or less of the tire height H from the rim separation point to the outside in the tire radial direction.

Another aspect of the present invention is that the maximum depth of the sidewall surface with respect to the virtual line is 15 mm or more and 35 mm or less.

Another aspect of the present invention is that a curvature radius (a curvature radius R2) of the sidewall surface in the cross section along the tread width direction of the tire and the tire radial direction is 50 mm or more in a no-load state with a normal inner pressure and no load applied.

Another aspect of the present invention is that at least a part of the block is disposed within the sidewall surface.

Another aspect of the present invention is that a curvature radius Ra of the sidewall surface in a no-load state with a normal inner pressure and no load applied and a curvature radius Rb of the sidewall surface in a normal-load state with the normal inner pressure and a normal load applied satisfy a relationship of $(Ra-Rb)/Ra \leq 0.5$.

Another aspect of the present invention is that a plurality of the blocks are arranged at a predetermined pitch in the tire circumferential direction, and each adjacent two of the blocks differ in position in the tire radial direction.

Another aspect of the present invention is that a height h of the block in the tread width direction is 3 mm or more and 25 mm or less.

Another aspect of the present invention is that a width w of the block in the tire circumferential direction is 2 mm or more and 10 mm or less.

Another aspect of the present invention is that relationships among a height h of the block, a predetermined pitch p of the blocks in the tire circumferential direction, and a width w of the block satisfy $1 \leq p/h \leq 50$ and $1 \leq (p-w)/w \leq 100$.

DESCRIPTION OF EMBODIMENTS

Figure 1:
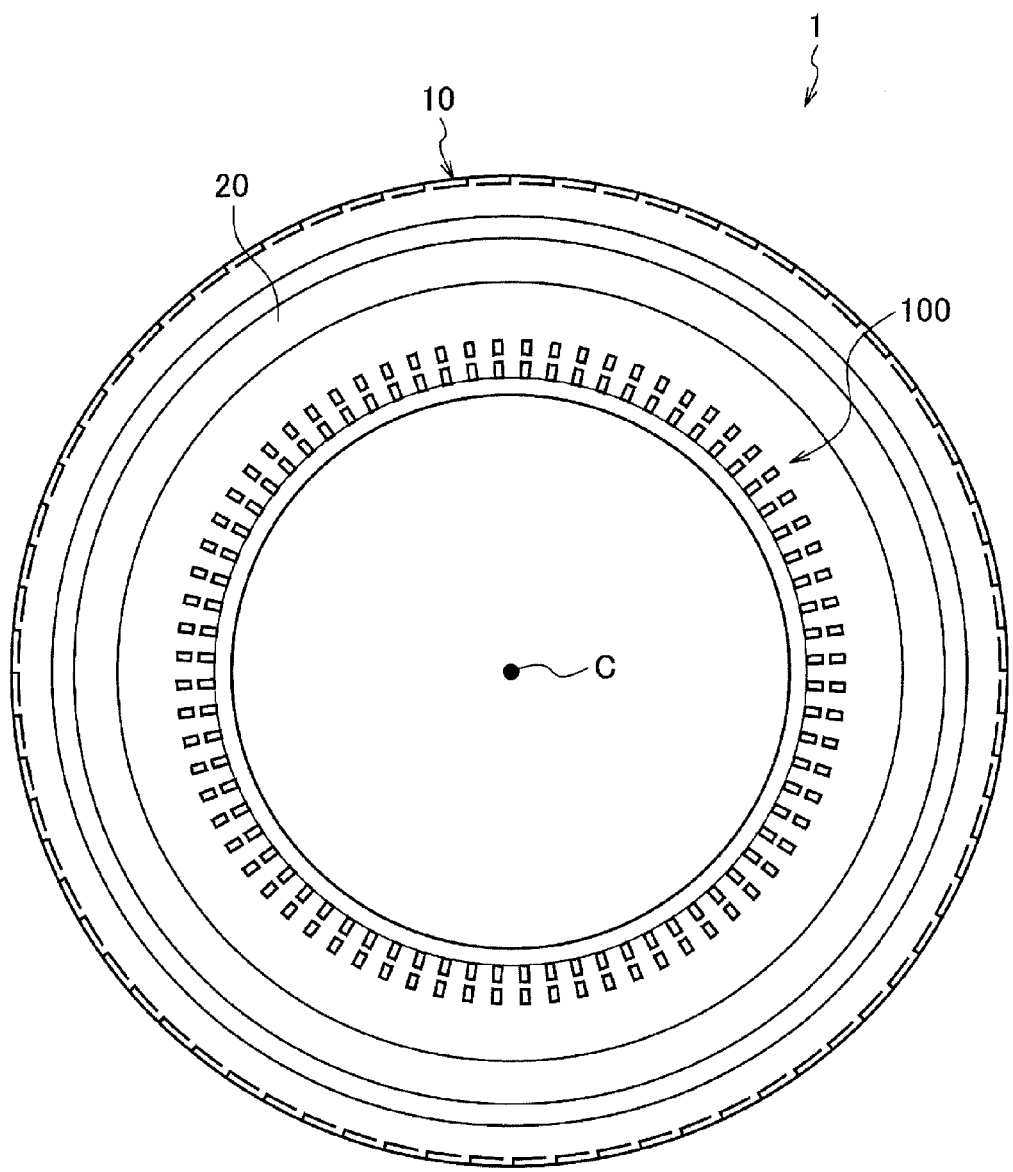
FIG. 1 is a sidewall surface view on a tire side section 20 side of a pneumatic tire 1 according to a first embodiment of the present invention.

Next, embodiments according to the present invention will be described with reference to the drawings. Note that, in the following description of the drawings, the same or similar parts will be denoted by the same or similar reference numerals. However, it should be noted that the drawings are conceptual and ratios of respective dimensions and the like are different from actual ones. Therefore, specific dimensions and the like should be determined by taking into consideration the following description. Moreover, also among the drawings, there are included portions in which dimensional relationships and ratios are different from each other.

First Embodiment

First, a first embodiment of the present invention is described.

(1) Configuration of Pneumatic Tire 1

Figure 2:
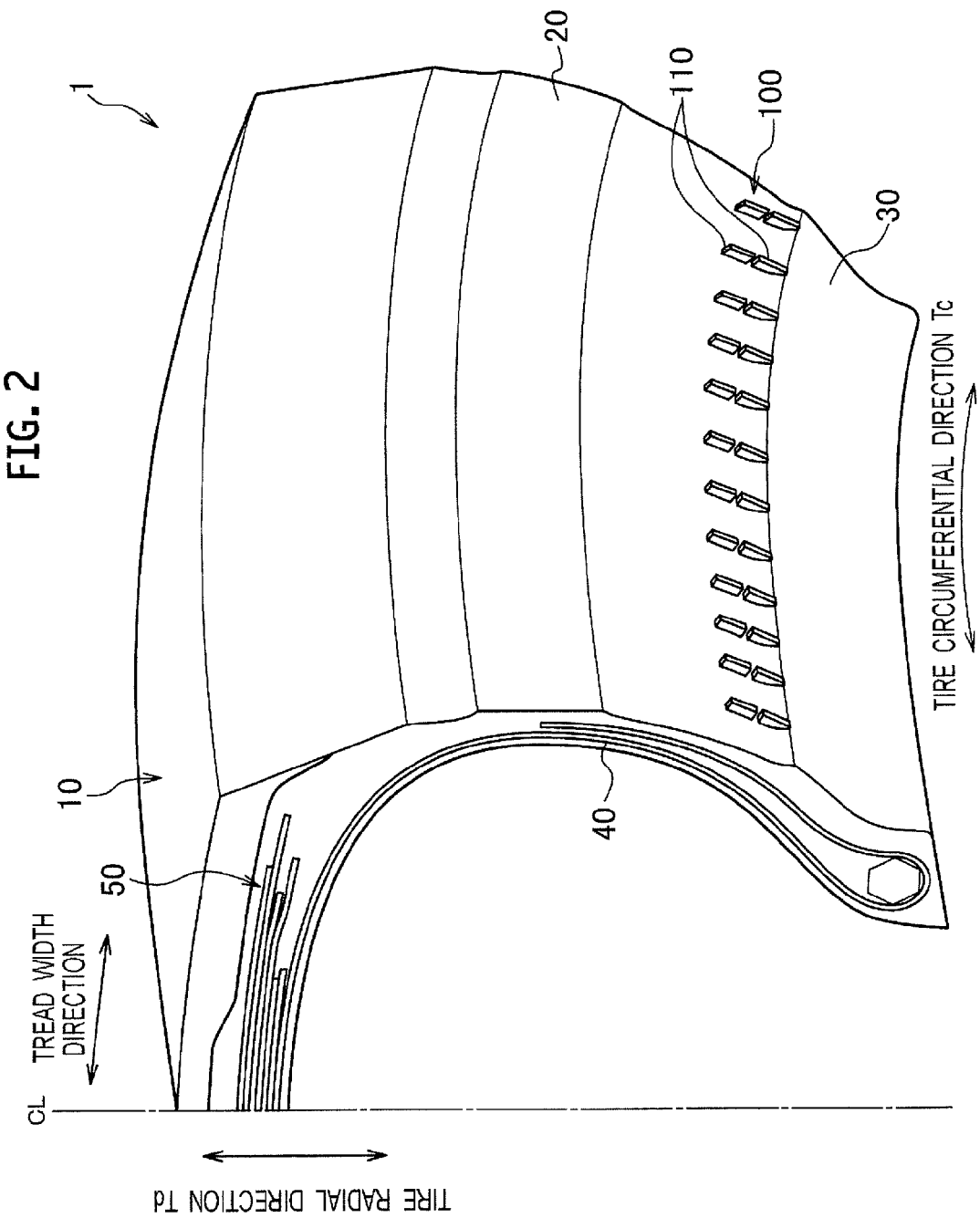
FIG. 2 is a partially exploded perspective view showing the pneumatic tire 1 according to the first embodiment of the present invention.
Figure 3:
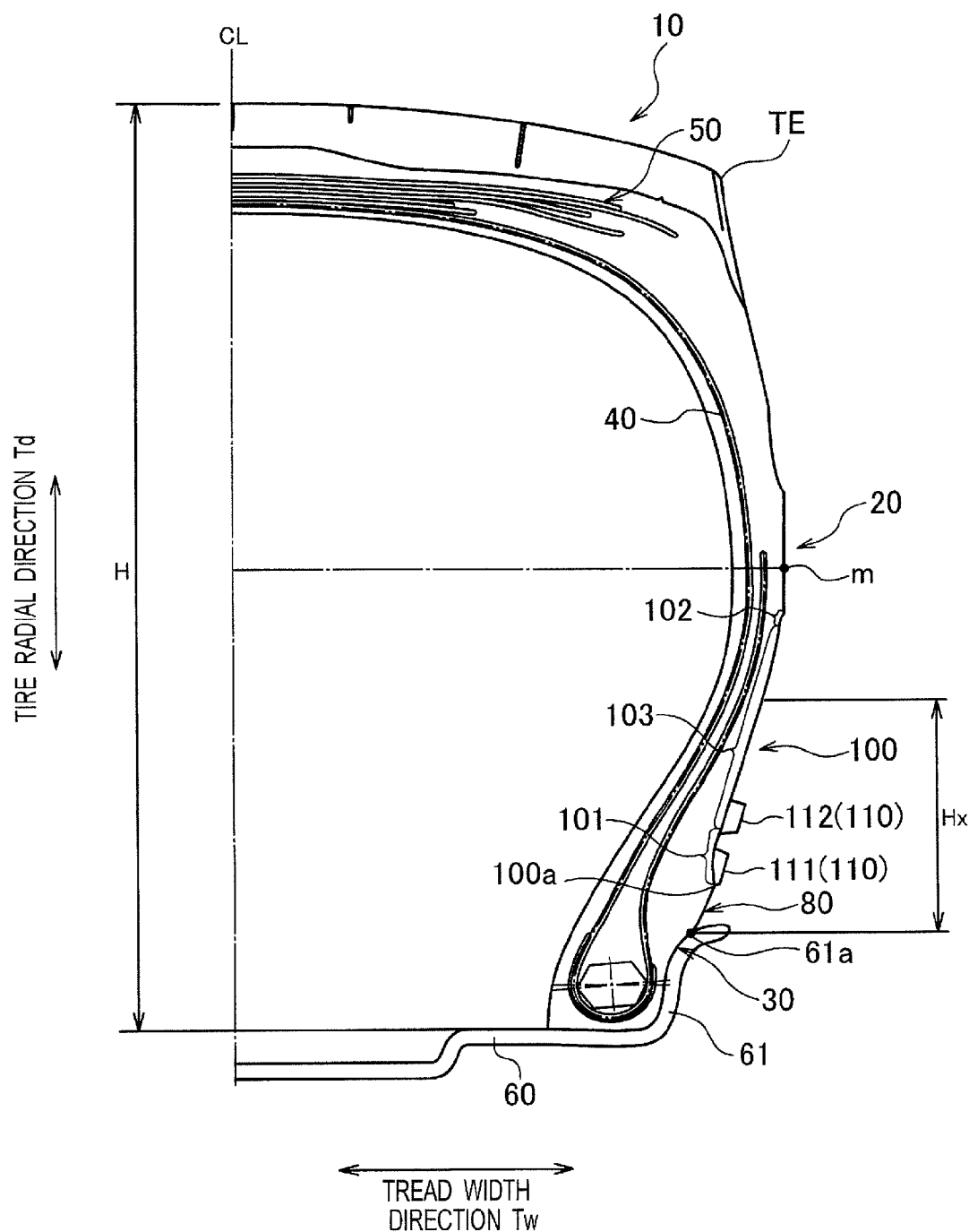
FIG. 3 is a cross-sectional view showing the pneumatic tire 1 according to the first embodiment of the present invention.

A pneumatic tire 1 according to this embodiment is a heavy load pneumatic tire mounted on a construction vehicle such as a dump truck. A configuration of the pneumatic tire 1 is described with reference to the drawings. FIG. 1 is a side view of the pneumatic tire 1 according to the first embodiment of the present invention. FIG. 2 is a partially exploded perspective view showing the pneumatic tire 1 according to this embodiment. FIG. 3 is a partial cross-sectional view showing the pneumatic tire 1 according to this embodiment.

As shown in FIGS. 1 to 3, the pneumatic tire 1 includes: a tread section 10 that comes into contact with a road surface during driving; and a tire side section 20 that is continuous with the tread section 10. A circumferential recess 100 which is depressed inward in a tread width direction Tw and extends in a tire circumferential direction Tc is formed on an outer surface of the tire side section 20. As shown in FIGS. 2 and 3, the pneumatic tire 1 also includes: a carcass 40 which forms the skeleton of the pneumatic tire 1; a bead section 30 assembled into a rim flange 61 (not shown in FIG. 2); and a belt layer 50 provided on the outside of the carcass 40 in a tire radial direction Td in the tread section 10.

The carcass 40 includes a carcass cord and a rubber layer covering the carcass cord. The carcass 40 has a folded portion, which is held to a bead core of the bead section 30 from the tread section 10 through the tire side section 20, and is folded from the inside to the outside in the tread width direction Tw. An end portion extending outward in the tire radial direction Td from the folded portion of the carcass 40 is disposed at a position of 40 to 65% of a tire height H. Note that the tire height H is described in detail later (see FIG. 3).

The belt layer 50 is formed by impregnating a steel cord with a rubber component. Also, the belt layer 50 includes multiple layers, which are laminated in the tire radial direction Td. The bead section 30 is provided along the tire circumferential direction Tc, and is disposed on either side of a tire equator line CL in the tread width direction Tw. Note that since the pneumatic tire 1 has a line-symmetric structure with respect to the tire equator line CL, FIGS. 2 and 3 show only one side thereof.

In this embodiment, on the outer surface of the tire side section 20, a rim-side outer surface 80 is formed in an area from a rim separation point 61a to an inner end 100a of the circumferential recess 100 in the tire radial direction Td in across section in the tread width direction Tw of the pneumatic tire 1 and the tire radial direction Td. Note that the rim separation point 61a is the outermost point in the tire radial direction Td where the pneumatic tire 1 comes into contact with the rim flange 61 of a rim wheel 60 in a state where the pneumatic tire 1 is mounted on the rim wheel 60. Also note that the end 100a is located on an outer side in the tread width direction Tw than a portion, of the tire side section 20, which comes into contact with the rim flange 61 when a load is applied to the tire.

The state where the pneumatic tire 1 is mounted on the rim wheel 60 means a state where the pneumatic tire 1 is mounted on a standard rim specified by the standards at an air pressure corresponding to the maximum load specified by the standards. The standards here refer to JATMA YEAR BOOK (2010 ver., Japan Automobile Tire Manufacturers Association Standards). Note that when TRA standards, ETRTO standards and the like are applied depending on the place of use or production, the respective standards are complied with.

Figure 4:
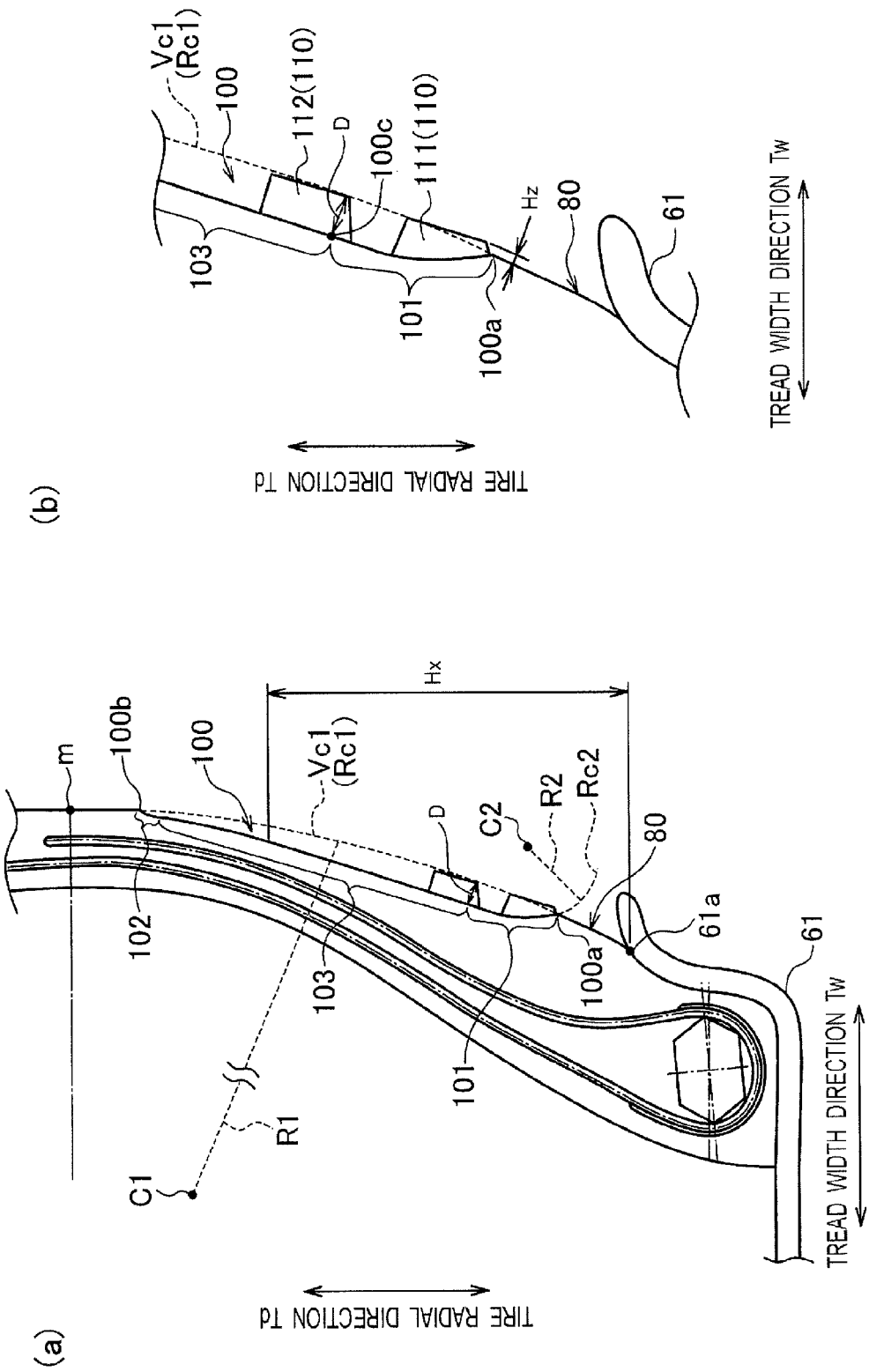
FIG. 4(a) is a partially enlarged cross-sectional view of the pneumatic tire 1 according to the first embodiment of the present invention.
FIG. 4(b) is a partially enlarged cross-sectional view of the pneumatic tire 1 according to the first embodiment of the present invention.

Moreover, the rim-side outer surface 80 is formed along a first arc curve Rc1 having a center C1 of a curvature radius R1 on the inside in the tread width direction Tw (see FIG. 4). In other words, the rim-side outer surface 80 is formed in a curved shape that bulges outward in the tread width direction Tw. By forming the rim-side outer surface 80 as described above, certain rigidity is ensured in a region of the tire side section 20 on the bead section 30 side. Note that the center C1 of the curvature radius R1 is preferably located on a virtual line extending in the tread width direction Tw from a position of a tire maximum width portion m.

(2) Configuration of Circumferential Recess

Next, a configuration of the circumferential recess 100 is concretely described. The circumferential recess 100 is formed in an area from the position of the tire maximum width portion m to the rim separation point 61a. Note that it is preferable that a length of the circumferential recess 100 in the tire radial direction Td and a depth thereof in the tread width direction Tw are appropriately determined based on the size of the pneumatic tire 1 and the type of a vehicle equipped therewith.

Also, the circumferential recess 100 includes: an inner wall surface 101 positioned on the inside of the circumferential recess 100 in the tire radial direction Td; an outer wall surface 102 positioned on the outside of the circumferential recess 100 in the tire radial direction Td; and a bottom surface 103 positioned between the inner wall surface 101 and the outer wall surface 102. Note that the circumferential recess 100 can be divided into three regions, in the tire radial direction Td, where the inner wall surface 101 is formed, where the outer wall surface 102 is formed, and where the bottom surface 103 is formed.

FIGS. 4(a) and 4(b) are partially enlarged cross-sectional views of the pneumatic tire 1 according to this embodiment. As shown in FIGS. 4(a) and 4(b), the inner wall surface 101 is formed in an area from the inner end 100a of the circumferential recess 100 in the tire radial direction Td to the bottom surface 103 of the circumferential recess 100. In other words, the inner wall surface 101 is formed to be continuous with the bottom surface 103.

Also, the inner wall surface 101 is formed along a second arc curve Rc2 having a center C2 of a curvature radius R2 on the outside in the tread width direction Tw in a cross section in the tread width direction Tw of the pneumatic tire 1 and the tire radial direction Td. In other words, the inner wall surface 101 is formed in a curved shape.

It is preferable that the curvature radius R2 of the inner wall surface 101 in the cross section in the tread width direction Tw of the pneumatic tire 1 and the tire radial direction Td is 50 mm or more in a no-load state where a normal inner pressure is applied and no load is applied. Note that, in this embodiment, the normal inner pressure is an inner pressure specified by the standards (JATMA YEAR BOOK) described above. Also, a normal load is the maximum load specified by the standards described above.

Moreover, in this embodiment, the maximum depth D of the inner wall surface 101 with respect to a virtual line Vc1 along which the first arc curve Rc1 extends to the circumferential recess 100 is within a range of 15 mm or more and 35 mm or less. Here, it should be noted that the first arc curve Rc1 and the virtual line Vc1 are on the same arc curve and that the virtual line Vc1 is indicated by the dotted line in the example shown in FIGS. 4(a) and 4(b). Note that the maximum depth D is an interval between the virtual line Vc1 and an outer end 100c of the inner wall surface 101 in the tire radial direction Td, as shown in FIG. 4(b). Also, in other words, it can also be said that, when there is provided a normal to the end 100c of the inner wall surface 101, the maximum depth D is a distance between the end 100c and a point where the normal and the virtual line Vc1 intersect with each other.

Moreover, in this embodiment, the inner wall surface 101 is provided at a position within a predetermined range from the rim separation point 61a to the outside in the tire radial direction Td. To be more specific, assuming that the tire height in the tire radial direction Td in the no-load state where the normal inner pressure and no load are applied is H, the inner wall surface 101 in the normal-load state where the normal inner pressure and normal load are applied to the pneumatic tire 1 is located within a range of 25% or less of the tire height H from the rim separation point 61a to the outside in the tire radial direction Td.

Note that, in this embodiment, the tire height H is a length in the tire radial direction Td from an inner lower end in the tire radial direction Td to a tread surface of the tread section 10 in a state where the pneumatic tire 1 is mounted on the rim wheel 60, as shown in FIG. 3.

In the pneumatic tire 1, a curvature radius Ra of the inner wall surface 101 in the no-load state with the normal inner pressure and no load applied and a curvature radius Rb of the inner wall surface 101 in the normal-load state with the normal inner pressure and normal load applied satisfy a relationship of $(Ra-Rb)/Ra \leq 0.5$.

Figure 5:
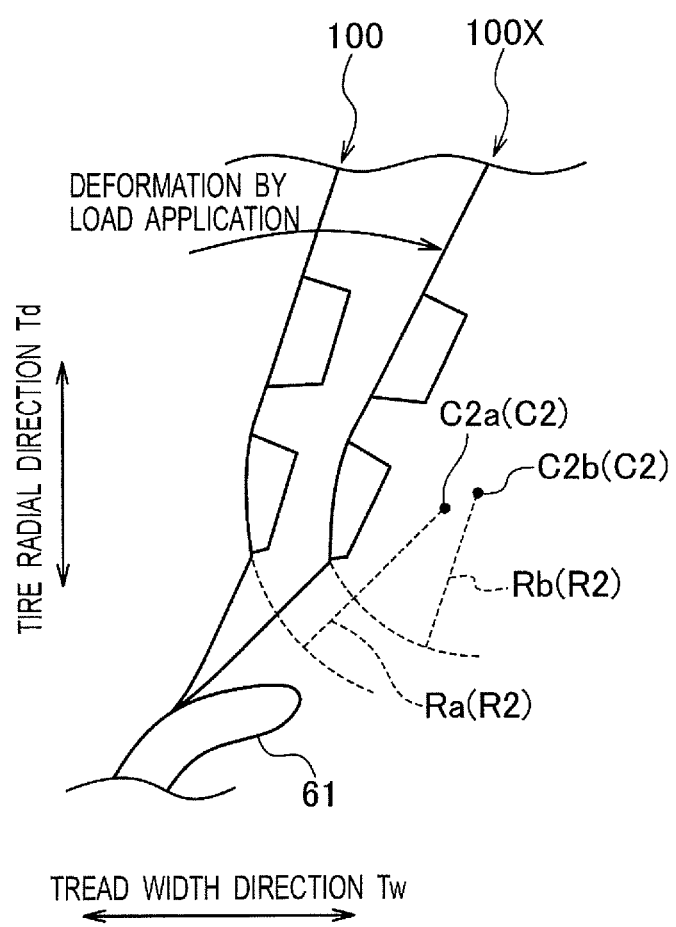
FIG. 5 is a partially enlarged cross-sectional view showing how a circumferential recess is deformed from a no-load state to a normal-load state.

Here, FIG. 5 shows a partially enlarged cross-sectional view showing how the circumferential recess 100 in the no-load state changes to a circumferential recess 100X in the normal-load state. As shown in FIG. 5, the curvature radius R2 of the inner wall surface 101 changes from the curvature radius Ra (R2) of the inner wall surface 101 in the no-load state to the curvature radius Rb (R2) of the inner wall surface 101 in the normal-load state. Also, the pneumatic tire 1 according to this embodiment is configured such that a rate of change in the curvature radius R2 of the inner wall surface 101 is 0.5 or less when the curvature radius R2 of the inner wall surface 101 changes from the curvature radius Ra (R2) to the curvature radius Rb (R2).

The outer wall surface 102 is positioned on the outside of the circumferential recess 100 in the tire radial direction Td. The outer wall surface 102 is formed in an area from an outer end 100b of the circumferential recess 100 in the tire radial direction Td to the bottom surface 103 of the circumferential recess 100. Note that it is preferable that the outer wall surface 102 is also formed in a curved shape as in the case of the inner wall surface 101. Also the bottom surface 103 is positioned on an inner side in the tread width direction Tw than the outer surface of the tire side section 20, and is connected with the inner wall surface 101 and the outer wall surface 102.

As described above, the circumferential recess 100 having the inner wall surface 101, the outer wall surface 102 and the bottom surface 103 is formed to be depressed inward from the outer surface in the tread width direction Tw, in the tire side section 20. Moreover, the formation of the circumferential recess 100 reduces the volume of rubber forming the tire side section 20 in the pneumatic tire 1.

(3) Configuration of Blocks

Next, with reference to the drawings, description is given of a configuration of blocks formed in the circumferential recess 100. In this embodiment, blocks 110 protruding outward in the tread width direction Tw are formed on the inside of the circumferential recess 100. Note that the inside of the circumferential recess 100 means an inside of a region between the inner end 100a of the circumferential recess 100 in the tire radial direction Td and the outer end 100b of the circumferential recess 100 in the tire radial direction Td.

To be more specific, in the pneumatic tire 1 according to this embodiment, a first block 111 and a second block 112 are formed as the blocks 110. Also, a plurality of the first blocks 111 and second blocks 112 are formed at predetermined intervals in the tire circumferential direction Tc, respectively. Note that, although the description is given of the example where two kinds of blocks, the first and second blocks 111 and 112, are formed in this embodiment, only one kind (e.g., the first block 111) of blocks 110 may be formed.

Moreover, in this embodiment, at least some of the blocks 110 are disposed within the inner wall surface 101. To be more specific, in this embodiment, all of the first blocks 111 and some of the second blocks 112 are disposed within the region where the inner wall surface 101 is formed. Note that at least some of the blocks 110 may be disposed within the region where the inner wall surface 101 is formed. For example, only some of the first blocks 111 may be disposed within the region where the inner wall surface 101 is formed.

Figure 6:
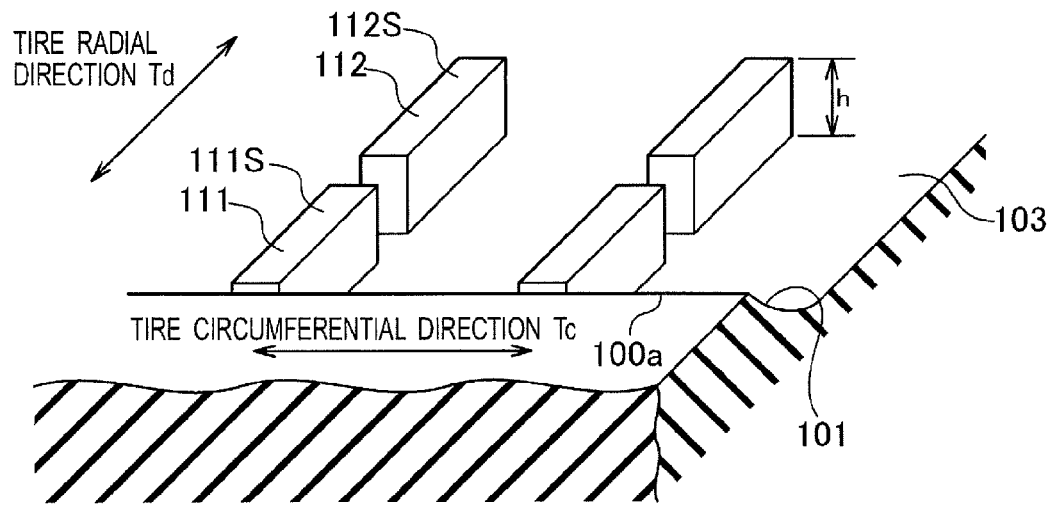
FIG. 6(a) is a partially enlarged perspective view of the circumferential recess according to the first embodiment.
FIG. 6(b) is a partially enlarged plan view of the circumferential recess according to the first embodiment.
Figure 6:
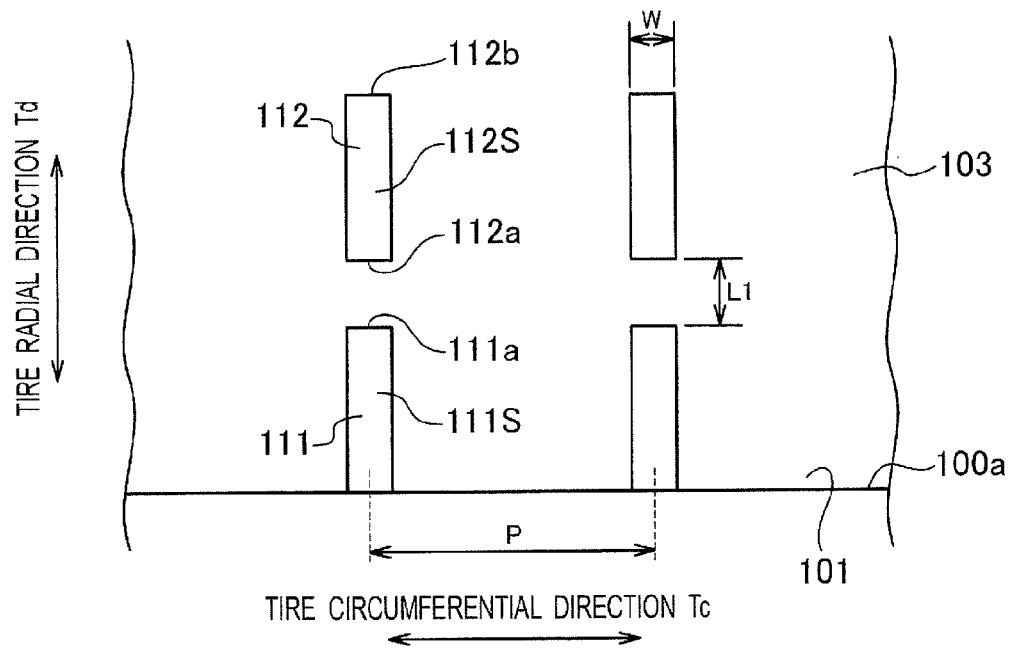

FIG. 6(a) shows a partially enlarged perspective view of the circumferential recess 100 according to this embodiment. FIG. 6(b) shows a partially enlarged plan view of the circumferential recess 100 according to the first embodiment. As shown in FIGS. 6(a) and 6(b), in the circumferential recess 100, the first blocks 111 are formed on the inside of the circumferential recess 100 in the tire radial direction Td, and the second blocks 112 are formed on the outer side in the tire radial direction Td than the first blocks 111. Here, the inner ends of the first blocks ill in the tire radial direction Td reach the inner end 100a of the circumferential recess 100 in the tire radial direction Td. In other words, the first blocks 111 are positioned at the inner end 100a of the circumferential recess 100 in the tire radial direction Td.

In this embodiment, the first blocks 111 and the second blocks 112 are formed in a straight line along the tire radial direction Td. The first and second blocks 111 and 112 are arranged radially with the center C (see FIG. 1) of the pneumatic tire 1 in the tire radial direction Td as a reference point.

The first blocks 111 and the second blocks 112 are formed with a space therebetween in the tire radial direction Td. Also, a width w of each of the first blocks 111 in the tire circumferential direction Tc and a width w of each of the second blocks 112 in the tire circumferential direction Tc are the same. To be more specific, the width w of the first block 111 in the tire circumferential direction Tc and the width w of the second block 112 in the tire circumferential direction Tc are set to 2 mm or more and 10 mm or less. Note that when a sidewall of the first block 111 (or the second block 112) is sloped to change the width w in the tire circumferential direction Tc, the width w in the tire circumferential direction Tc is set to the average of the maximum width and the minimum width.

It is preferable that a distance L1 between the first blocks 111 and the second blocks 112 in the tire radial direction Td is 15% to 30% of a pitch p of the first blocks 111 (or the second blocks 112) in the tire circumferential direction Tc. This is because of the following reason. Specifically, when the distance L1 is less than 15% of the pitch p, the flow of air entering the circumferential recess 100 is blocked, causing many air retention portions (regions) in the circumferential recess 100. On the other hand, when the distance L1 is larger than 30% of the pitch p, the airflow that repeats attachment to and separation from the bottom surface 103 is not likely to be generated.

Note that, as shown in FIG. 6(b), the pitch p in the tire circumferential direction Tc means a linear distance along the circumferential direction between the center of the first block 111 (or the second block 112) in the tire circumferential direction and the center of another first block 111 (or second block 112) adjacent thereto in the tire circumferential direction.

Also, in this embodiment, a height h of the blocks 110 in the tread width direction Tw is 3 mm or more and 25 mm or less. More specifically, a height h of the first blocks 111 and a height h of the second blocks 112 are 3 mm or more and 25 mm or less. Note that, in this embodiment, the height h of the first blocks 111 (or the second blocks 112) means a distance from the inner wall surface 101 or the outer wall surface 102 or the bottom surface 103 where the first blocks 111 (or the second blocks 112) are positioned to the vertically most distant point of the first blocks 111 (or the second blocks 112).

Moreover, in this embodiment, relationships among the height of the first blocks 111 (or the second blocks 112), the predetermined pitch p of the first blocks 111 (or the second blocks 112) in the tire circumferential direction Tc, and the width w of the first blocks 111 (or the second blocks 112) satisfy $1 \leq p/h \leq 50$ and $1 \leq (p-w)/w \leq 100$.

Furthermore, it is preferable that an outer surface 111S of the first block 111 in the tread width direction Tw and an outer surface 112S of the second block 112 in the tread width direction Tw are flat surfaces. It is also preferable that an angle formed by the surface 111S of the first block 111 and a sidewall surface extending from an outer tip 111a of the first block 111 on the outside in the tire radial direction Td to the bottom surface 103 is an obtuse angle. This is because of the following reason. Specifically, during production of the pneumatic tire, removability in removing the pneumatic tire 1 from a mold is improved. Thus, generation of cracks and the like in the pneumatic tire 1 can be suppressed. As a result, a high-quality pneumatic tire 1 can be produced.

Likewise, it is preferable that an angle formed by the surface 112S of the second block 112 and a sidewall surface extending from an inner tip 112a of the second block 112 on the inside in the tire radial direction Td to the bottom surface 103 is also an obtuse angle. Moreover, it is preferable that an angle formed by the surface 112S of the second block 112 and a sidewall surface extending from an outer tip 112b of the second block 112 on the outside in the tire radial direction Td to the bottom surface 103 is also an obtuse angle.

Furthermore, the same goes for sidewall surfaces of the first and second blocks 111 and 112 in the tire circumferential direction Tc. To be more specific, it is preferable that an angle formed by the surface 111S of the first block 111 and the sidewall surface in the tire circumferential direction Tc is also an obtuse angle. Also, it is preferable that an angle formed by the surface 112S of the second block 112 and the sidewall surface in the tire circumferential direction Tc is also an obtuse angle.

In this embodiment, at least a part of the block 110 protrudes further to the outside in the tread width direction Tw than the first arc curve Rc1. To be more specific, when the virtual line Vc1 is drawn, along which the first arc curve Rc1 extends to the circumferential recess 100, at least a part of the block 110 protrudes further to the outside in the tread width direction Tw than the virtual line Vc1. More specifically, as shown in FIG. 4(b), a part of the first block 111 is formed to protrude further to the outside in the tread width direction Tw by a protrusion height Hz than the virtual line Vc1 along which the first arc curve Rc1 extends.

It is preferable that the protrusion height Hz is within a range of 1 to 25 mm. It is more preferable that the protrusion height Hz is within a range of 2 to 10 mm.

Here, considering the removability during production of the pneumatic tire 1, it is preferable that the surface 111S of the first block ill and the surface 112S of the second block 112 are formed in the shape of a flat surface. As described above, considering the point that the surfaces 111S and 112S are formed in the shape of the flat surface and the amount of air flowing into the circumferential recess 100, the protrusion height Hz is preferably 25 mm or less. Meanwhile, when the protrusion height Hz is less than 1 mm, the amount of air taken into the circumferential recess 100 is reduced. This suppresses a cooling effect. For this reason, the protrusion height Hz is preferably 1 mm or more.

(4) Turbulence Generated State

Next, with reference to the drawings, description is given of a state where turbulence is generated by the circumferential recess 100 according to the first embodiment.

Figure 7:
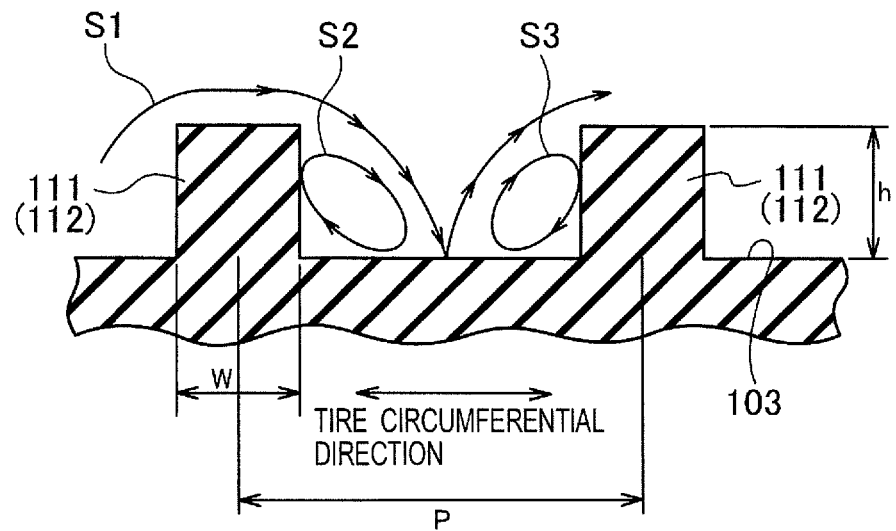
FIG. 7(a) is a partially enlarged cross-sectional view of the circumferential recess in a tread width direction for explaining a state where turbulence is generated.
FIG. 7(b) is a partially enlarged plan view of the circumferential recess for explaining the state where turbulence is generated.
Figure 7:
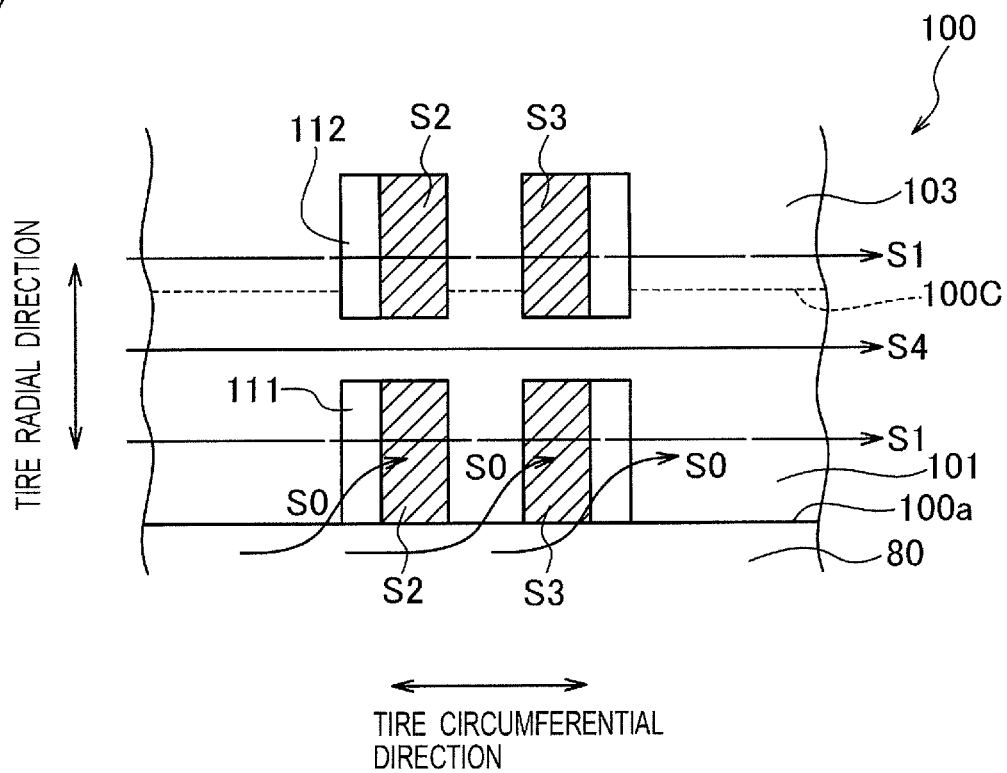

FIG. 7(a) is a partially enlarged cross-sectional view of the circumferential recess 100 in the tread width direction for explaining the state where turbulence is generated. FIG. 7(b) is a partially enlarged plan view of the circumferential recess 100 for explaining the state where turbulence is generated.

As shown in FIG. 7(a), rotation of the pneumatic tire 1 causes an airflow S1 along the bottom surface 103 inside the circumferential recess 100 to separate from the bottom surface 103 (or the inner wall surface 101) at the second block 112 (or the first block 111) and then go over the second block 112 (or the first block 111). In this event, there arises a portion (region) where the airflow is disrupted on the back side (right side of the first or second block shown in FIGS. 7(a) and 7(b)) of the second block 112 (or the first block 111). Then, the airflow S1 reattaches to the bottom surface 103 (or the inner wall surface 101) between the second block (or the first block) and the next second block 112 (or the first block 111), and then separates again at the next second block 112 (or the first block 111). In this event, there arises a portion (region) where the airflow is disrupted on the front side (left side of the first or second block shown in FIGS. 7(a) and 7(b)) of the second block 112 (or the first block 111).

Here, when the airflow S1 heads toward the bottom surface 103 (or the inner wall surface 101) beyond the second block 112 (or the first block 111), air S2 flowing in the disrupted portion (region) flows such that the air is drawn into the airflow S1 while removing heat retained on the back side of the second block 112 (or the first block 111).

Moreover, when the airflow S1 separates from the bottom surface 103 (or the inner wall surface 101) and goes over the next second block 112 (or the first block 111), air S3 flowing in the disrupted portion (region) flows such that the air is drawn into the airflow S1 while removing heat retained on the front side of the second block 112 (or the first block 111).

Meanwhile, as shown in FIG. 7(b), in the circumferential recess 100, the first blocks 111 and the second blocks 112 are formed with a space therebetween in the tire radial direction. For this reason, rotation of the pneumatic tire 1 causes an airflow S4 between the first blocks 111 and the second blocks 112. Here, since the airflow S4 flows without going over the first and second blocks 111 and 112, the speed thereof is faster than that of the airflow S1 shown in FIG. 7(a). For this reason, the air S2 and S3 flowing in the portions (regions) where the airflow is disrupted within the circumferential recess 100 flow such that the air is drawn into the airflow S4 while removing heat retained on the back and front sides of the second block 112 (or the first block 111).

As described above, the airflow S1 going over the first and second blocks and the airflow S4 between the outer tip 111a positioned on the outside of the first block 111 in the tire radial direction Td and the inner tip 112a positioned on the inside of the second block 112 in the tire radial direction Td cause the air entering into the circumferential recess 100 in the pneumatic tire 1 to flow as turbulence.

Here, as shown in FIG. 7(b), an airflow S0 along the rim-side outer surface 80 flows into the circumferential recess 100 along the inner wall surface 101 and then merges with the airflow S1 or S4. In this embodiment, since the inner wall surface 101 has the curved shape, the airflow S0 along the rim-side outer surface 80 is likely to flow into the circumferential recess 100 along the curved inner wall surface 101.

Moreover, in this embodiment, a part of the first block 111 is formed to protrude further to the outside in the tread width direction Tw than the first arc curve Rc1 along the rim-side outer surface 80. Thus, the airflow S0 is likely to flow into the circumferential recess 100 while hitting against apart of the first block 111 protruding further to the outside in the tread width direction Tw than the first arc curve Rc1 along the rim-side outer surface 80.

(5) Advantageous Effects

Next, description is given of advantageous effects of the pneumatic tire according to this embodiment. In the pneumatic tire 1 according to this embodiment, the circumferential recess 100, which is depressed inward in the tread width direction Tw and extends in the tire circumferential direction Tc, is formed on the outer surface of the tire side section 20.

According to the pneumatic tire 1 as described above, the formation of the circumferential recess 100 enables reduction in a distance between a high-temperature portion on the inside of the tire (particularly, the inside on the bead section 30 side) and a heat release surface (the surface of the circumferential recess 100). Thus, the pneumatic tire 1 can enhance an effect of suppressing an increase in temperature of the rubber.

Moreover, in the pneumatic tire 1 according to this embodiment, the formation of the circumferential recess 100 reduces the volume of the rubber used for the tire side section 20 compared with the case where no circumferential recess 100 is formed. In other words, in the tire side section 20, an amount of rubber to be deformed with the rotation of the pneumatic tire 1 is reduced. Thus, heat generation due to the deformation of the rubber in the tire side section 20 can be suppressed. Furthermore, since the amount of rubber for producing the pneumatic tire 1 can be reduced, production cost for the pneumatic tire 1 can be reduced.

The rim-side outer surface 80 from the rim separation point 61a to the inner end 100a of the circumferential recess 100 in the tire radial direction Td is formed along the first arc curve Rc1 having the center C1 of the curvature radius R1 on the inside in the tread width direction Tw. More specifically, the rim-side outer surface 80 of the tire side section 20 is formed in the curved shape that bulges outward in the tread width direction Tw. By forming the rim-side outer surface 80 as described above, certain rigidity is ensured in the region of the tire side section 20 on the bead section 30 side.

Meanwhile, the inner wall surface 101 extending from the inner end 100a of the circumferential recess 100 in the tire radial direction Td to the bottom surface 103 of the circumferential recess 100 is formed along the second arc curve Rc2 having the center C2 of the curvature radius R2 on the outside in the tread width direction Tw. In other words, in the circumferential recess 100, the region from the inner end 100a in the tire radial direction Td to the bottom surface 103 is formed to be depressed by the curved shape.

According to the pneumatic tire 1 as described above, the rotation of the tire allows the air flowing along the rim-side outer surface 80 of the tire side section 20 to smoothly flow into the circumferential recess 100 along the inner wall surface 101 having the curved shape. In other words, an increase in temperature of the rubber can be suppressed by increasing the amount of air flowing into the circumferential recess 100.

Moreover, on the inside of the circumferential recess 100, the blocks 110 (the first blocks 111 and the second blocks 112) are formed, which protrude outward in the tread width direction Tw. Here, if the blocks 110 are arranged in the tire side section without providing the circumferential recess 100, a sufficient effect of suppressing the increase in temperature of the rubber may not be achieved due to a too large gauge thickness. By arranging the blocks 110 on the inside of the circumferential recess 100 as in the case of this embodiment, the effect of suppressing the increase in temperature of the rubber can be sufficiently enhanced.

Moreover, in this embodiment, a part of the first block 111 is formed to protrude further to the outside in the tread width direction Tw by the protrusion height Hz than the first arc curve Rc1 along the rim-side outer surface 80. According to the pneumatic tire 1 as described above, the air flowing along the outer surface of the tire side section 20 is likely to flow into the circumferential recess 100 while hitting against the protruding portions of the first blocks 111. In other words, the increase in temperature of the rubber can be suppressed by increasing the amount of air flowing into the circumferential recess 100.

As described above, the pneumatic tire 1 according to this embodiment can suppress the increase in temperature of the rubber in the tire side section 20, particularly on the bead section 30 side, while reducing the production cost.

Furthermore, on the inside of the circumferential recess 100, the first blocks 111 and second blocks 112 extending in the tire radial direction Td are formed as the blocks 110. Also, the outer tip 111a of each of the first blocks 111 and the inner tip 112a of each of the second blocks 112 are separated from each other in the tire radial direction Td. This causes turbulence of air inside the circumferential recess 100 along with the rotation of the pneumatic tire 1. To be more specific, the air flowing on the outer surface of the tire side section 20 enters into the circumferential recess 100 and flows over the first blocks 111 and the second blocks 112. Therefore, the air entering into the circumferential recess 100 flows as turbulence, repeating attachment to and separation from the inner wall surface 101, the outer wall surface 102 and the bottom surface 103. In this event, the flow of air entering into the circumferential recess 100 removes heat on the bead section 30 side of the tire side section 20 whose temperature is increased by the rotation of the pneumatic tire 1. In other words, heat release is facilitated with the circumferential recess 100 as a starting point. Thus, the increase in temperature on the bead section 30 side of the tire side section 20 can be suppressed. As a result, deterioration of the tire due to the increase in temperature of the bead section 30 can be suppressed. Thus, durability of the pneumatic tire 1 can be improved.

Moreover, in this embodiment, the inner wall surface 101 of the circumferential recess 100 is formed in an area Hx that is 25% or less of the tire cross-section height H from the rim separation point 61a of the pneumatic tire 1 in the cross section along the tread width direction Tw and the tire radial direction Td. In other words, the curved inner wall surface 101 is formed within the area Hx near the bead section 30 of the tire side section 20.

According to the pneumatic tire 1 described above, the inner end 100a of the circumferential recess 100 in the tire radial direction Td is provided further to the outside in the tire radial direction Td than the rim separation point 61a. This configuration can suppress the increase in temperature without significantly escalating the fall of the carcass 40 during load application. If the inner end 100a of the circumferential recess 100 is provided below the rim separation point 61a, the fall of the carcass 40 is escalated during load application. As a result, durability of the bead section 30 is significantly deteriorated.

With the inner wall surface 101 provided within the area Hx that is 25% or less of the tire height H from the rim separation point 61a, the distance from the high-temperature region in the tire to the surface of the circumferential recess 100, which is the heat release surface, can be reduced. Thus, an effect of suppressing the increase in temperature can be achieved. If the inner wall surface 101 is provided at a position larger than 25% of the cross-section height, the distance from the high-temperature region in the tire to the tire surface (the inner wall surface 101) that is the heat release surface cannot be reduced. For this reason, the effect of suppressing the increase in temperature cannot be sufficiently achieved.

Here, since the bead section 30 is fitted to the rigid rim wheel 60, deformation due to falling toward the rim flange 61 or friction with the rim flange 61 is likely to occur in the state where the pneumatic tire 1 is mounted on the vehicle. For this reason, the temperature of the bead section 30 is likely to be increased by heat generation. In the pneumatic tire 1 according to this embodiment, the formation of the circumferential recess 100 in the area Hx described above can increase the effect of suppressing the increase in temperature of the bead section 30 that is likely to generate heat.

Moreover, in this embodiment, the maximum depth D of the inner wall surface 101 of the circumferential recess 100 is within the range of 15 mm or more and 35 mm or less. When the maximum depth D of the inner wall surface 101 is larger than 35 mm, the fall of the carcass 40 is significantly increased during load application. Furthermore, in this case, the durability of the bead section 30 is deteriorated, and heat buildup is escalated by an increase in deformation amount. As a result, the increase in temperature cannot be effectively suppressed. On the other hand, when the maximum depth D of the inner wall surface 101 is smaller than 15 mm, the air flowing on the outer surface of the tire side section 20 does not easily enter into the circumferential recess 100. Thus, the effect of suppressing the increase in temperature is deteriorated.

In this embodiment, the curvature radius R2 of the inner wall surface 101 of the circumferential recess 100 is set to 50 mm or more in the no-load state with the normal inner pressure and no load applied. When the curvature radius R2 of the inner wall surface 101 is less than 50 mm, distortion of the inner wall surface 101, which is caused by the fall of the carcass 40 during load application, is locally concentrated. This deteriorates resistance to cracks on the bead section 30 side of the tire side section 20.

Also, in the pneumatic tire 1 according to this embodiment, the entire first block 111 and a part of the second block 112 are disposed within the region of the inner wall surface 101. According to the pneumatic tire 1 described above, the air smoothly flowing along the curved inner wall surface 101 hits against the first and second blocks 111 and 112. Thus, the air flowing as turbulence inside the circumferential recess 100 can be further activated.

Moreover, in this embodiment, the height h of the blocks 110 is 3 mm or more and 25 mm or less. The pneumatic tire 1 described above can exert the effect of suppressing the increase in temperature of the rubber even when the pneumatic tire 1 is used in any of practical speed ranges of a tire for construction vehicle.

Furthermore, in this embodiment, the width w of the blocks 110 in the tire circumferential direction Tc is within the range of 2 mm or more and 10 mm or less. When the width w of the blocks 110 in the tire circumferential direction Tc is less than 2 mm, the blocks 110 may be vibrated by the flow of air drawn into the circumferential recess 100. Moreover, when the width w of the blocks 110 in the tire circumferential direction Tc is less than 2 mm, the blocks may be broken during driving on a rough road due to reduction in rigidity of the blocks. On the other hand, when the width w of the blocks 110 in the tire circumferential direction Tc is larger than 10 mm, the blocks become likely to generate heat due to an increase in the amount of rubber forming the respective blocks. This deteriorates the effect of suppressing the increase in temperature by the formation of the circumferential recess 100.

Furthermore, in this embodiment, the relationships among the height h of the blocks 110, the predetermined pitch p of the blocks 110 in the tire circumferential direction Tc, and the width w of the blocks 110 satisfy $1 \leq p/h \leq 50$ and $1 \leq (p-w)/w \leq 100$. Accordingly, by specifying the range of p/h, the state of the airflow drawn into the circumferential recess 100 can be roughly sorted out with p/h. If the pitch p is too small, it becomes difficult for the air entering into the circumferential recess 100 to attach to the bottom surface 103. In this case, no turbulence of air is generated and the air remains in a region near the bottom surface 103 of the circumferential recess 100. On the other hand, when the pitch p is too large, a resultant state is close to the case where no blocks 110 are formed. This makes it hard to generate turbulence. Here, (p−w)/w represents a ratio of the width w of the block 110 to the pitch p. Too small a ratio means the same as that a surface area of each block 110 is equal to an area of a surface whose temperature rise is wished to be suppressed by heat release. Since the blocks are made of rubber, the effect of improving heat release by increasing the surface area cannot be expected. For this reason, the minimum value of (p−w)/w is set to 1.

Second Embodiment

Figure 8:
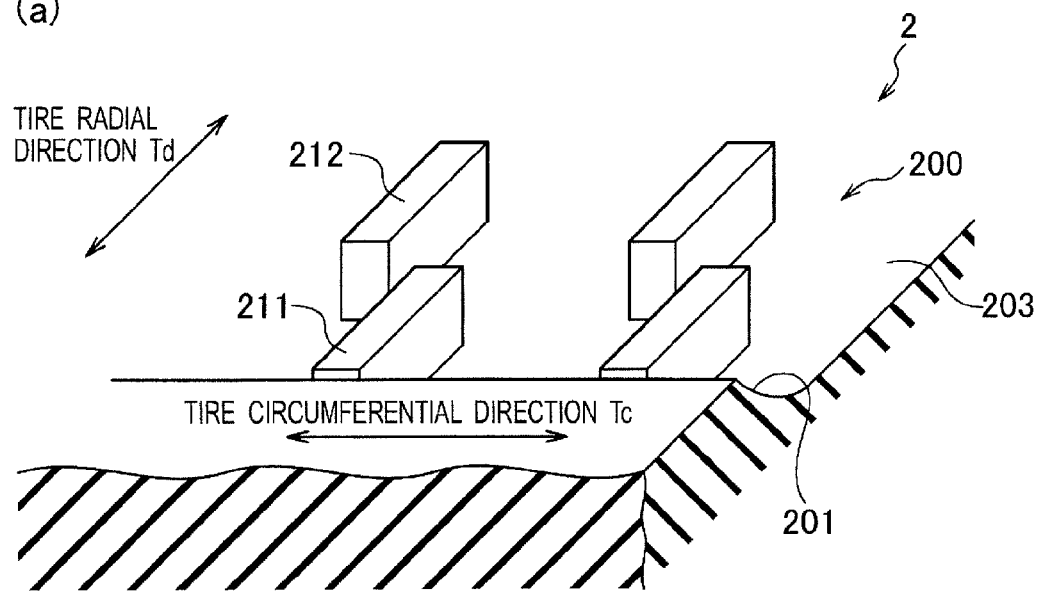
FIG. 8(a) is a partially enlarged perspective view of a circumferential recess 200 according to a second embodiment.
FIG. 8(b) is a partially enlarged plan view of the circumferential recess 200 according to the second embodiment.
Figure 8:
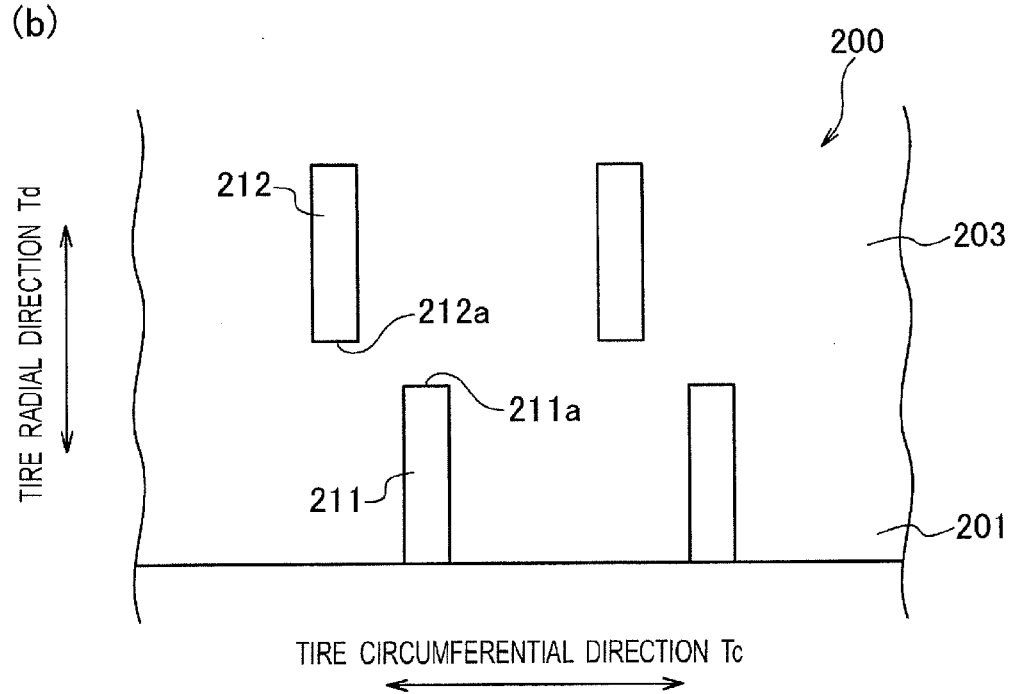

Next, description is given of a pneumatic tire 2 according to a second embodiment of the present invention. Note that detailed description of the same configuration as that of the first embodiment is omitted as appropriate. FIG. 8(a) is a partially enlarged perspective view of a circumferential recess 200 according to the second embodiment. FIG. 8(b) is a partially enlarged plan view of the circumferential recess 200 according to the second embodiment.

In the pneumatic tire 2 according to this embodiment, the circumferential recess 200 is formed in a tire side section 20. In the circumferential recess 200, multiple blocks 110 are arranged at a predetermined pitch in the tire circumferential direction Tc. To be more specific, multiple first blocks 211 are formed in the circumferential recess 200, which are positioned on the inner side in the tire radial direction Td. Also, multiple second blocks 212 are formed in the circumferential recess 200, which are positioned on the outer side in the tire radial direction Td than the first blocks 211.

The circumferential recess 200 according to this embodiment is different from the circumferential recess 100 according to the first embodiment in that the first and second blocks 211 and 212 are alternately formed in the tire circumferential direction Tc. In other words, in the circumferential recess 200 according to this embodiment, the two kinds of blocks (the first blocks 211 and the second blocks 212) adjacent to each other in the tire circumferential direction Tc are alternately disposed at positions shifted from each other in the tire radial direction Td.

In the pneumatic tire 2 according to this embodiment, there is a shift between when air entering into the circumferential recess 200 goes over the first block 211 and when the air goes over the second block 212 along with rotation of the pneumatic tire 2. In other words, a position of a portion (region) where an airflow generated on the back side of the first block 211 is disrupted and a position of a portion (region) where an airflow generated on the back side of the second block 212 is disrupted are shifted from each other in the tire circumferential direction Tc. Therefore, since the portions (regions) are dispersed in the tire circumferential direction Tc, the air entering into the circumferential recess 200 is likely to be turbulence. As a result, the airflow is activated, and thus an increase in temperature on the bead section 30 side of the tire side section 20 can be suppressed with the circumferential recess 200 as a starting point. Accordingly, durability of the pneumatic tire 2 can be improved.

Modified Example

Figure 9:
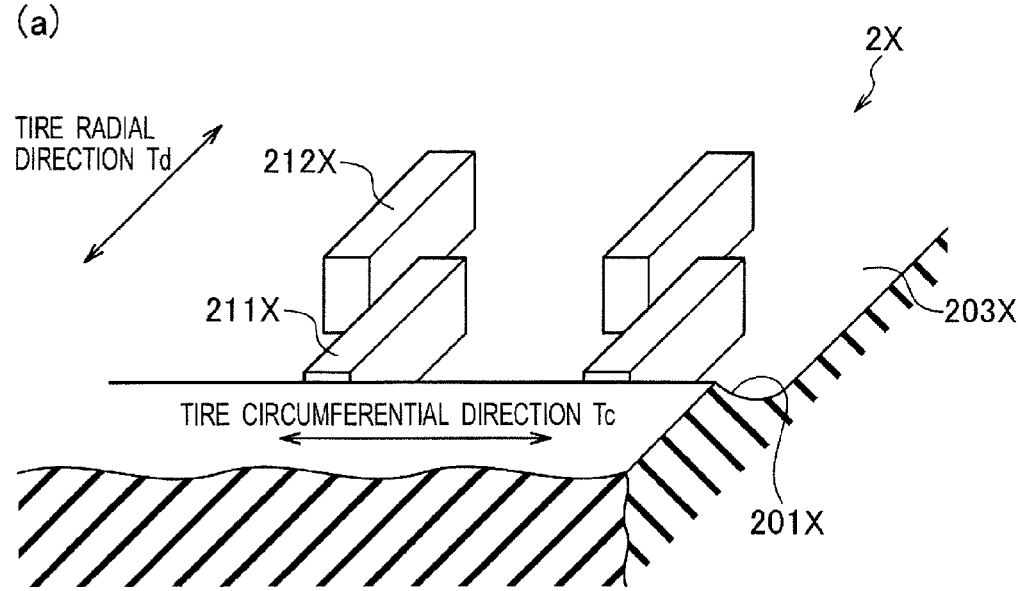
FIG. 9(a) is a partially enlarged perspective view of a circumferential recess 200X according to a modified example of the second embodiment.
FIG. 9(b) is a partially enlarged plan view of the circumferential recess 200X according to the modified example of the second embodiment.
Figure 9:
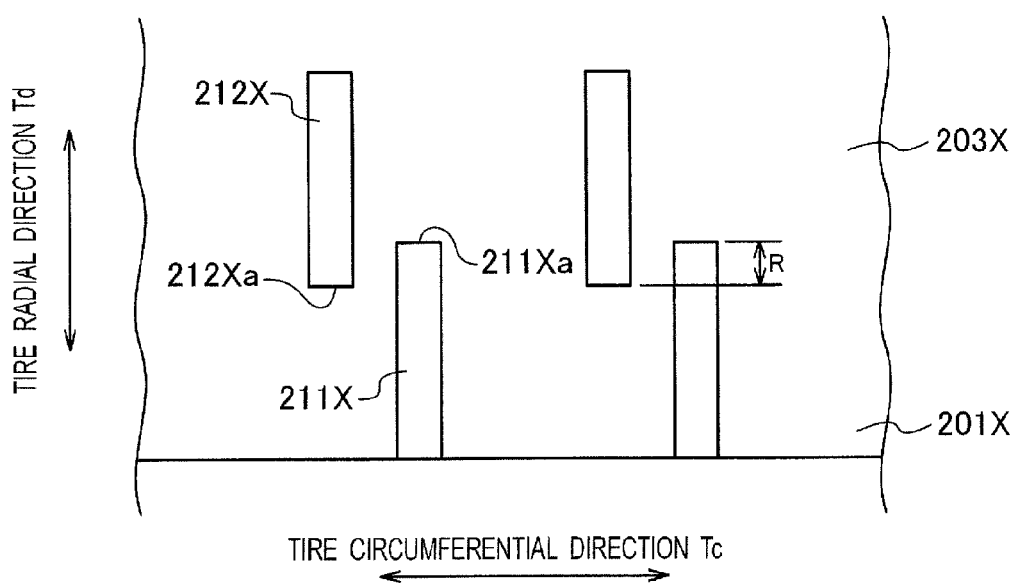

Next, description is given of a pneumatic tire 2X according to a modified example of the second embodiment. Note that detailed description of the same configuration as that of the second embodiment is omitted as appropriate. FIG. 9(a) is a partially enlarged perspective view of a circumferential recess 200X according to the modified example of the second embodiment. FIG. 9(b) is a partially enlarged plan view of the circumferential recess 200X according to the modified example of the second embodiment.

In the pneumatic tire 2X according to the modified example, the circumferential recess 200X is formed in a tire side section 20X. In the circumferential recess 200X, multiple first blocks 211X and multiple second blocks 212X are formed as the blocks. The first blocks 211X are positioned on the inner side in the tire radial direction Td. The second blocks 212X are positioned on the outer side in the tire radial direction Td than the first blocks 211X.

The circumferential recess 200X according to the modified example is different from the circumferential recess 200 according to the second embodiment in that an outer tip 211Xa of the first block 211X is positioned on the outer side in the tire radial direction Td than an inner tip 212Xa of the second block 212X. In other words, the inner tip 212Xa of the second block 212X is positioned on the inner side in the tire radial direction Td than the outer tip 211Xa of the first block 211X. More specifically, the circumferential recess 200X according to the modified example has an overlap region R where the first block 211X and the second block 212X overlap with each other in the tire circumferential direction Tc.

In the pneumatic tire 2X according to the modified example, an airflow passing over the first block 211X, an airflow passing over the second block 212X and an airflow passing over the first and second blocks 211X and 212X in the overlap region R are generated along with the rotation of the pneumatic tire 2X. Accordingly, air entering into the circumferential recess 200X flows more actively as turbulence. Therefore, the airflow is activated in portions (regions) where the air is likely to be retained. Thus, an increase in temperature of the bead section 30 can be suppressed with the circumferential recess 200X as a starting point. As a result, durability of the pneumatic tire 2X can be further improved.

Third Embodiment

Figure 10:
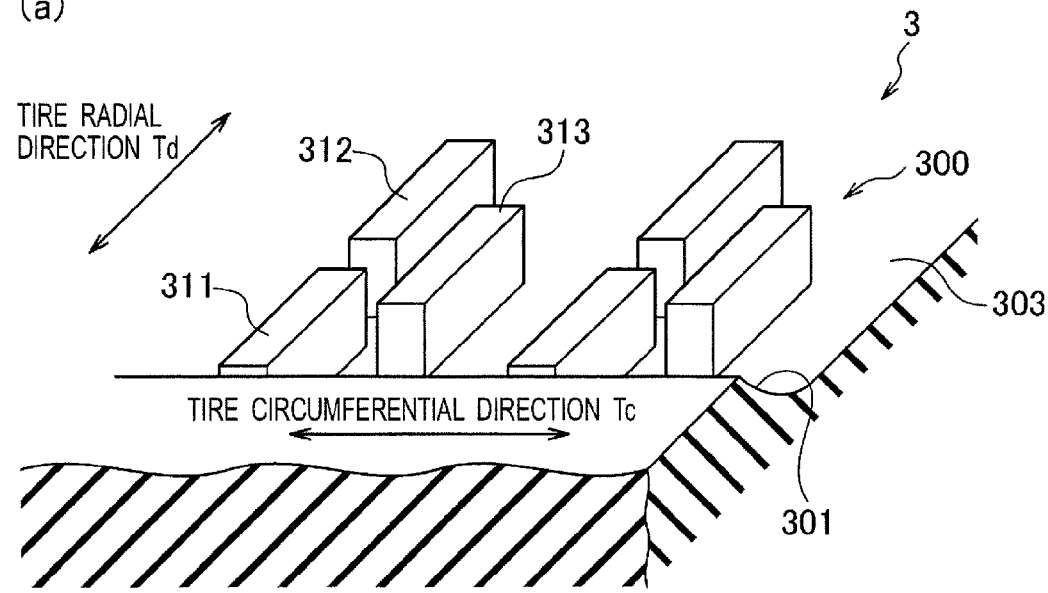
FIG. 10(a) is a partially enlarged perspective view of a circumferential recess 300 according to a third embodiment.
FIG. 10(b) is a partially enlarged plan view of the circumferential recess 300 according to the third embodiment.
Figure 10:
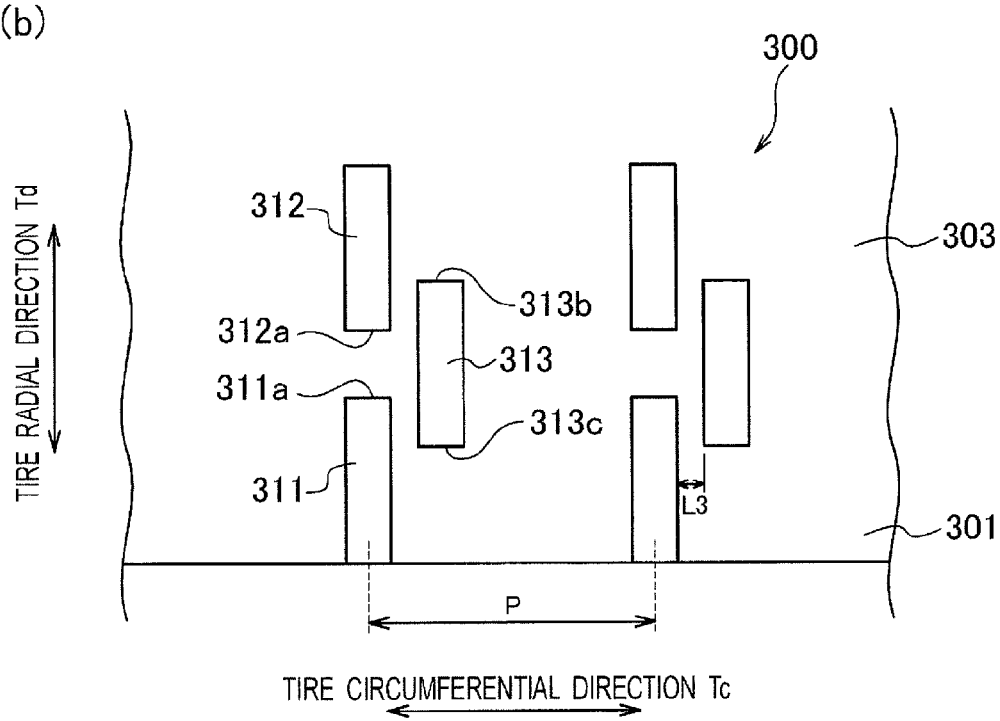

Next, description is given of a pneumatic tire 3 according to a third embodiment of the present invention. Note that detailed description of the same configuration as that of the first embodiment is omitted as appropriate. FIG. 10(a) is a partially enlarged perspective view of a circumferential recess 300 according to the third embodiment. FIG. 10(b) is a partially enlarged plan view of the circumferential recess 300 according to the third embodiment.

In the pneumatic tire 3 according to this embodiment, the circumferential recess 300 is formed in a tire side section 20. In the circumferential recess 300, multiple first blocks 311 and multiple second blocks 312 are formed. The first blocks 311 are positioned on the inner side in the tire radial direction Td. The second blocks 312 are positioned on the outer side in the tire radial direction Td than the first blocks 311. Note that the first and second blocks 311 and 312 have the same configuration as that of the first and second blocks 111 and 112 in the circumferential recess 100 according to the first embodiment.

The circumferential recess 300 according to this embodiment is different from that of the first embodiment in that third blocks 313 separated in the tire circumferential direction Tc from the first and second blocks 311 and 312 are formed in the circumferential recess 300. The third blocks 313 are formed to protrude outward in the tread width direction Tw from a bottom surface 303 of the circumferential recess 300. In this embodiment, a width w of the third block 313 in the tire circumferential direction Tc and a height h thereof in the tread width direction Tw are the same as those of the second block 312. Also, the third block 313 is formed at a position closer to one of the first blocks 311 and the second blocks 312 than a ½ point of a pitch p of the first blocks 311 and the second blocks 312. A distance L3 between the third block 313 and the first and second blocks 311 and 312 in the tire circumferential direction Tc is set to be 5 to 10% of the pitch p.

Moreover, as shown in FIGS. 10(a) and 10(b), an inner end 313c of the third block 313 is positioned on the inner side in the tire radial direction Td than an outer tip 311a of the first block 311. Also, an outer end 313b of the third block 313 is positioned on the outer side in the tire radial direction Td than an inner tip 312a of the second block 312.

In the pneumatic tire 3 according to this embodiment, by further forming the third blocks 313 in the circumferential recess 300, turbulence of air entering into the circumferential recess 300 is likely to be generated. To be more specific, the air entering into the circumferential recess 300 flows inside the circumferential recess 300 while passing over not only the first and second blocks 311 and 312 but also the third blocks 313. In other words, the air flows as larger turbulence that repeats attachment to and separation from an inner wall surface 301, an outer wall surface 302 and the bottom surface 303. The air entering into the circumferential recess 300 flows while removing heat in portions (regions) where the air is retained on the back sides of the first block 311, second block 312 and third block 313. As a result, an increase in temperature of the bead section 30 can be further suppressed.

Moreover, the inner end 313c of the third block 313 is positioned on the inner side in the tire radial direction Td than the outer tip 311a of the first block 311. Also, the outer end 313b is positioned on the outer side in the tire radial direction Td than the inner tip 312a of the second block 312. Accordingly, the air hitting against the third block 313 turn into a flow passing over the third block 313 and a flow toward the both sides of the third block 313 in the tire radial direction Td along with rotation of the pneumatic tire 3. This airflow toward the both sides of the third block 313 in the tire radial direction Td activates the airflow in the portions where the air is likely to be retained on the back sides of the first and second blocks 311 and 312. Thus, heat release in the circumferential recess 300 is facilitated, and the increase in temperature of the bead section 30 can be further suppressed. As a result, durability of the pneumatic tire 3 can be improved.

[Comparative Evaluation]

Next, in order to further clarify the effects of the present invention, description is given of comparative evaluation conducted using the following pneumatic tires according to a conventional example, comparative examples and examples. Note that the present invention is not limited to these examples.

(1) Evaluation Method

The effect of suppressing an increase in temperature of the tire side section is evaluated by conducting tests using various pneumatic tires.

Figure 11:
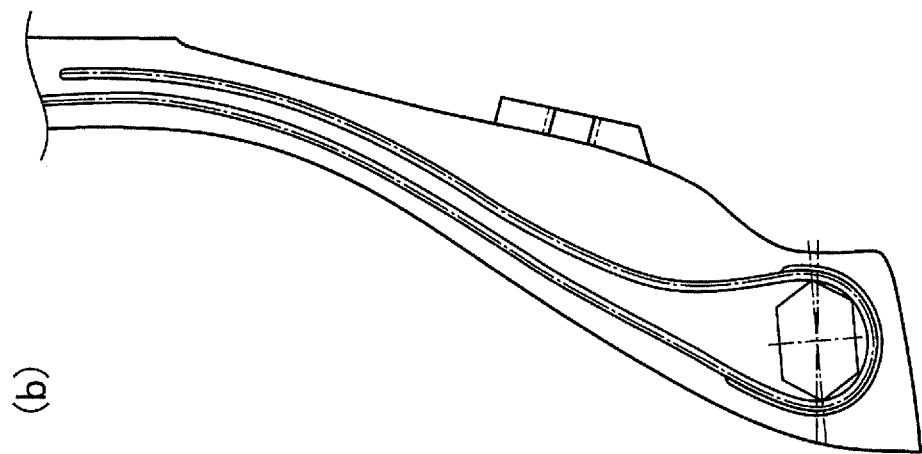
FIG. 11(a) is a partially enlarged cross-sectional view of a pneumatic tire according to a conventional example.
FIG. 11(b) is a partially enlarged cross-sectional view of a pneumatic tire according to a comparative example.
Figure 11:
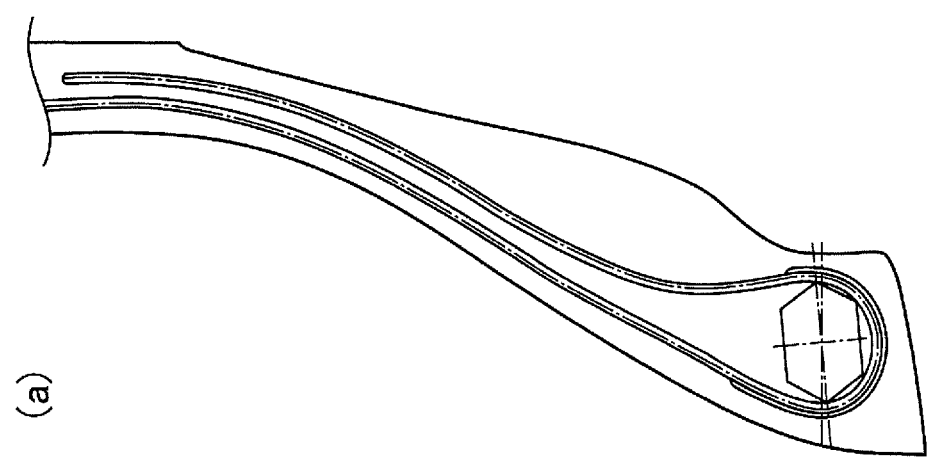

As a pneumatic tire according to the conventional example, as shown in FIG. 11(a), a pneumatic tire having no circumferential recess and no blocks provided in a tire side section is used. As a pneumatic tire according to comparative example 1, as shown in FIG. 11(b), a pneumatic tire having blocks formed in a tire side section is used, the blocks protruding outward in the tread width direction Tw from an outer surface of the tire side section. As a pneumatic tire according to comparative example 2, a pneumatic tire having a circumferential recess formed in a tire side section and having no blocks formed on the inside of the circumferential recess is used, the blocks protruding outward in the tread width direction Tw. Note that the blocks in the pneumatic tire according to comparative example 2 do not protrude further to the outside than a virtual line along which a first arc curve extends to the circumferential recess.

As pneumatic tires according to examples 1 to 7, pneumatic tires each having a circumferential recess formed in a tire side section and having blocks formed on the inside of the circumferential recess are used, the blocks protruding outward in the tread width direction Tw. Note that Table 1 shows configuration details of examples 1 to 7. Note that the blocks in the pneumatic tires according to examples 1 to 7 protrude further to the outside than a virtual line along which a first arc curve extends to the circumferential recess.

As to the evaluation, first, all the tires are leaned against a wall in groups of three and left for one week. Then, each of the tires is assembled into a TRA-standard rim wheel and mounted on a vehicle with a normal load and a normal inner pressure. Thereafter, the vehicle is run for 24 hours and then the temperature at 5 mm outside of the carcass 40 in the tread width direction is measured at six spots equally spaced apart in the tire circumferential direction by inserting a thermoelectric body into a narrow hole provided beforehand at a position 40 mm outside in the tire radial direction from an upper end of a rim flange. As values of evaluation, the average of the temperatures measured at the six spots is used, showing a temperature difference from the tire of the conventional example. Note that conditions for the vehicle and evaluation tests are as follows.

Tire size: 59/80R63
Type of tire: heavy-load tire
Vehicle: 320 ton dump truck
Speed of vehicle: 15 km/h
Driving time: 24 hours (2) Evaluation Result With reference to Table 1, description is given of evaluation results of the respective pneumatic tires.

TABLE 1

|  | CONVENTIONAL EXAMPLE | COMPARATIVE EXAMPLE 1 | COMPARATIVE EXAMPLE 2 | EXAMPLE 1 | EXAMPLE 2 |
|---|---|---|---|---|---|
| MAXIMUM DEPTH (mm) OF INNER WALL SURFACE WITH RESPECT TO FIRST ARC CURVE | — | — | 20 | 10 | 15 |
| POSITION OF INNER WALL SURFACE FROM RIM SEPARATION POINT OF OUTER END (RATIO TO TIRE HEIGHT H) | — | — | 20% | 20% | 20% |
| BLOCK MAXIMUM HEIGHT (mm) | — | 20 | 20 | 20 | 20 |
| BLOCK LENGTH (mm) | — | 120 | 120 | 120 | 120 |
| NUMBER OF BLOCKS | — | 3 | 3 | 3 | 3 |
| PROTRUSION OF BLOCK FROM FIRST ARC CURVE (BLOCK POSITIONED AT INNERMOST POSITION IN RADIAL DIRECTION) | — | — | ABSENT | PRESENT | PRESENT |
| TEMPERATURE DIFFERENCE (° C.) FROM CONVENTIONAL EXAMPLE AFTER 24 h DRIVING | — | −1.0 | −3.3 | −3.4 | −4.9 |

|  | EXAMPLE 3 | EXAMPLE 4 | EXAMPLE 5 | EXAMPLE 6 | EXAMPLE 7 |
|---|---|---|---|---|---|
| MAXIMUM DEPTH (mm) OF INNER WALL SURFACE WITH RESPECT TO FIRST ARC CURVE | 20 | 35 | 40 | 20 | 20 |
| POSITION OF INNER WALL SURFACE FROM RIM SEPARATION POINT OF OUTER END (RATIO TO TIRE HEIGHT H) | 20% | 20% | 20% | 25% | 30% |
| BLOCK MAXIMUM HEIGHT (mm) | 20 | 20 | 20 | 20 | 20 |
| BLOCK LENGTH (mm) | 120 | 120 | 120 | 120 | 120 |
| NUMBER OF BLOCKS | 3 | 3 | 3 | 3 | 3 |
| PROTRUSION OF BLOCK FROM FIRST ARC CURVE (BLOCK POSITIONED AT INNERMOST POSITION IN RADIAL DIRECTION) | PRESENT | PRESENT | PRESENT | PRESENT | PRESENT |

TABLE 1-continued

| | | | | | |
|---|---|---|---|---|---|
| TEMPERATURE DIFFERENCE (° C.) FROM CONVENTIONAL EXAMPLE AFTER 24 h DRIVING | −5.3 | −4.5 | −3.0 | −5.3 | −3.2 |

As shown in Table 1, the pneumatic tires according to examples 1 to 7 are proven to have a larger effect of suppressing the increase in temperature of the bead section 30 compared with the pneumatic tires according to the conventional example and comparative examples 1 and 2.

Note that, in Table 1, the block maximum height is the height h described above, indicating a vertical distance from the inner wall surface 101 or the outer wall surface 102 or the bottom surface 103 where the blocks are positioned to the most distant point of the block.

Also, it should be noted that "MAXIMUM DEPTH OF INNER WALL SURFACE WITH RESPECT TO FIRST ARC CURVE" in Table 1 means the depth of the inner wall surface other than the innermost region in the tire radial direction Td.

Other Embodiments

As described above, the contents of the present invention have been disclosed through the embodiments of the present invention. However, it should be understood that the present invention is not limited to the description and drawings which constitute a part of this disclosure. From this disclosure, various alternative embodiments, examples and operational technologies will become apparent to those skilled in the art.

For example, the embodiments of the present invention may be changed to a pneumatic tire 4 shown in FIGS. 12(a) and 12(b). FIG. 12(a) is a partially enlarged perspective view of a circumferential recess 400 according to another embodiment. FIG. 12(b) is a partially enlarged plan view of the circumferential recess 400 according to another embodiment. Note that, here, detailed description of the same configuration as that of the first embodiment is omitted as appropriate.

In the pneumatic tire 4 according to this embodiment, the circumferential recess 400 is formed in a tire side section 20. The circumferential recess 400 includes: an inner wall surface 401 positioned on the inside of the circumferential recess 400 in the tire radial direction Td; an outer wall surface 402 positioned on the outside of the circumferential recess 400 in the tire radial direction Td; and a bottom surface 403 positioned between the inner wall surface 401 and the outer wall surface 402. Note that configurations of the inner wall surface 401, the outer wall surface 402 and the bottom surface 403 are the same as those of the inner wall surface 101, the outer wall surface 102 and the bottom surface 103 according to the first embodiment.

On the inside of the circumferential recess 400, a first block 411 is formed on the inner side of the circumferential recess 400 in the tire radial direction Td, and a second block 412 is formed on the outer side in the tire radial direction Td than the first block 411. Furthermore, in the circumferential recess 400, a third block 413 is formed with a predetermined space in the tire circumferential direction from the first block 411 and the second block 412. Note that this embodiment is different from the first embodiment in that the third block 413 is formed.

The first block 411 and the second block 412 are formed in a straight line along the tire radial direction Td. Note that the first and second blocks 411 and 412 have the same configurations as those of the first and second blocks 111 and 112 according to the first embodiment.

Moreover, a length of the third block 413 in the tire radial direction Td is equal to a length from an inner end of the first block 411 in the tire radial direction to an outer end of the second block 412 in the tire radial direction. In the circumferential recess 400, as shown in FIGS. 12(a) and 12(b), the third blocks 413 and a pair of the first and second blocks 411 and 412 are alternately formed in the tire circumferential direction at predetermined intervals in the tire circumferential direction.

In the pneumatic tire 4 according to this embodiment, the formation of the third block 413 allows air to flow while passing over not only the first and second blocks 411 and 412 but also the third block 413 along with rotation of the pneumatic tire 4. Moreover, turbulence generated by the first and second blocks 411 and 412 flows passing over the third block 413. Thus, the air entering into the circumferential recess 400 actively flows as larger turbulence. As a result, heat release is facilitated with the circumferential recess 400 as a starting point, and an increase in temperature of the bead section 30 can be suppressed.

Figure 13:
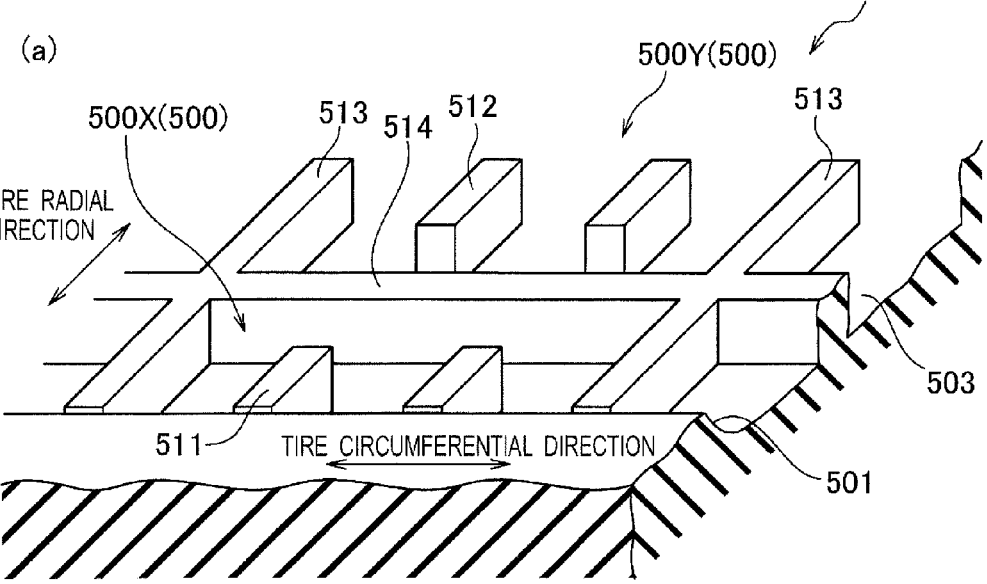
FIG. 13(a) is a partially enlarged perspective view of a circumferential recess according to another embodiment.
FIG. 13(b) is a partially enlarged plan view of the circumferential recess according to another embodiment.
Figure 13:
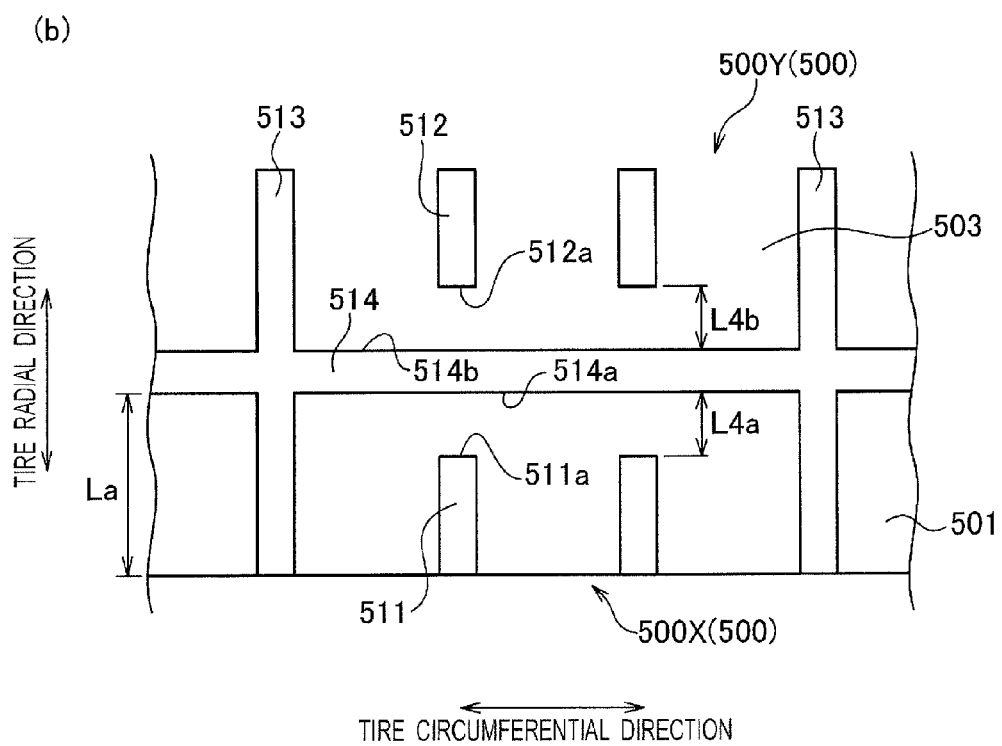

Furthermore, for example, the embodiments of the present invention may be changed to a pneumatic tire 5 shown in FIGS. 13(a) and 13(b). FIG. 13(a) is a partially enlarged perspective view of a circumferential recess 500 according to another embodiment. FIG. 13(b) is a partially enlarged plan view of the circumferential recess 500 according to another embodiment. Note that, here, detailed description of the same configuration as that of the first embodiment is omitted as appropriate.

Figure 12:
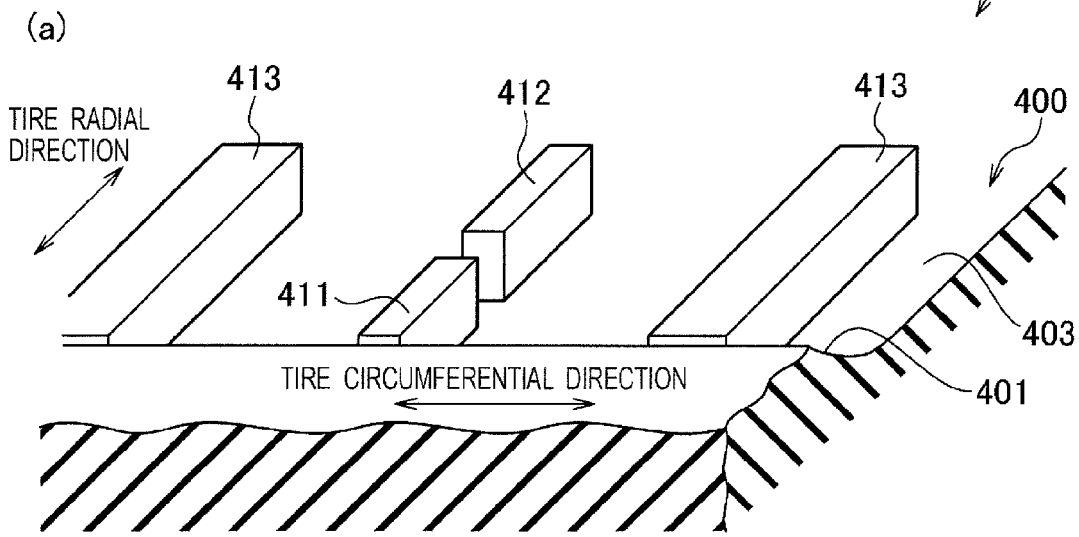
FIG. 12(a) is a partially enlarged perspective view of a circumferential recess according to another embodiment.
FIG. 12(b) is a partially enlarged plan view of the circumferential recess according to another embodiment.
Figure 12:
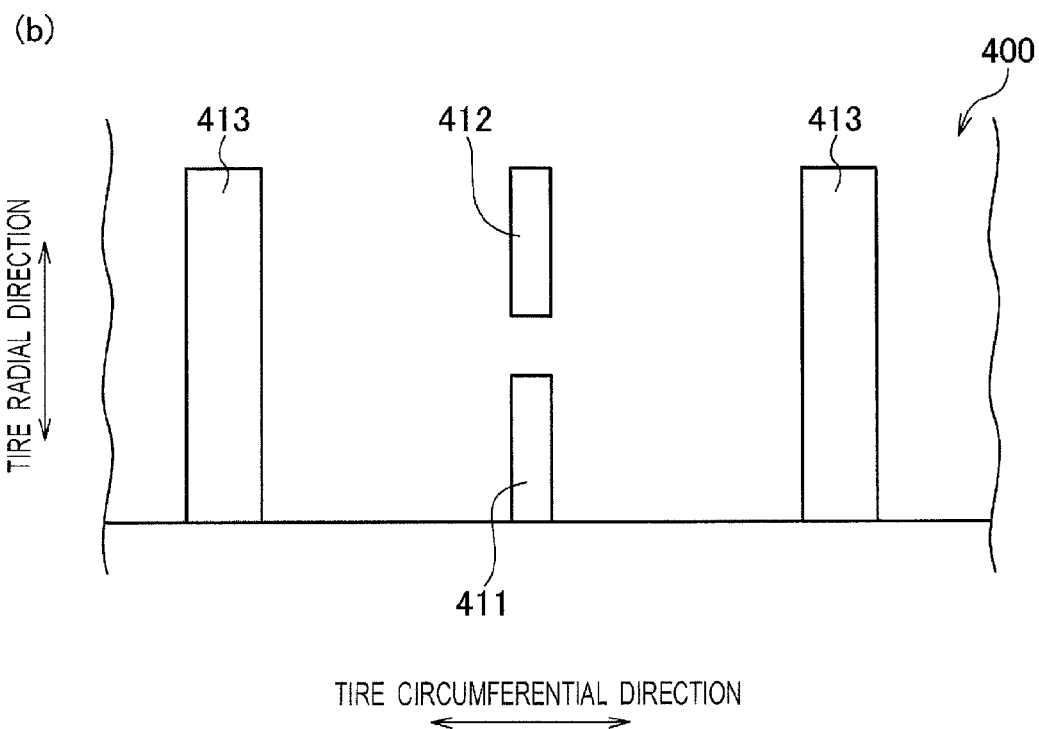

Note that a main difference between the pneumatic tire 5 and the pneumatic tire 4 shown in FIG. 12 is formation of a fourth block 514 extending in the tire circumferential direction Tc. To be more specific, in the pneumatic tire 5, the circumferential recess 500 is formed in a tire side section 20. The circumferential recess 500 includes: an inner wall surface 501 positioned on the inside of the circumferential recess 500 in the tire radial direction Td; an outer wall surface 502 positioned on the outside of the circumferential recess 500 in the tire radial direction Td; and a bottom surface 503 positioned between the inner wall surface 501 and the outer wall surface 502.

On the inside of the circumferential recess 500, a first block 511 is formed on the inner side of the circumferential recess 500 in the tire radial direction Td, and a second block 512 is formed on the outer side in the tire radial direction Td than the first block 511. Furthermore, in the circumferential recess 500, a third block 513 extending in the tire radial direction Td is formed.

A length of the third block 513 in the tire radial direction Td is equal to a length from an inner end of the first block 511 in the tire radial direction to an outer end of the second block 512 in the tire radial direction. In the circumferential recess 500, as shown in FIGS. 13(a) and 13(b), a plurality of the third blocks 513 are formed at predetermined intervals in the tire circumferential direction, and a plurality of the first blocks 511 (and a plurality of the second blocks 512) are formed between the third blocks 513.

Furthermore, in the circumferential recess 500 according to this embodiment, the fourth block 514 extending in the tire circumferential direction Tc is formed. The fourth block 514 is positioned between the first blocks 511 and the second blocks 512 in the tire radial direction, and extends in the tire circumferential direction. The fourth block 514 is continuously formed in the tire circumferential direction.

Such formation of the fourth block 514 divides the circumferential recess 500 into a circumferential recess 500X and a circumferential recess 500Y in the tire radial direction Td. To be more specific, the circumferential recess 500X is positioned on the inner side in the tire radial direction than the circumferential recess 500Y. The first blocks 511 are formed in the circumferential recess 500X, and the second blocks 512 are formed in the circumferential recess 500Y.

A distance L4a along the tire radial direction between an outer end 511a of the first block 511 in the tire radial direction and an inner end 514a of the fourth block 514 in the tire radial direction is set to be 15% to 30% of a pitch p of the first blocks 511 in the tire circumferential direction.

A distance L4b along the tire radial direction between an inner end 512a of the second block 512 in the tire radial direction and an outer end 514b of the fourth block 514 in the tire radial direction is set to be 15% to 30% of a pitch p of the second blocks 512 in the tire circumferential direction.

The widths and spacing of the first to third blocks 511 to 513 in the tire circumferential direction are set to be within a proper range depending on the size of the pneumatic tire 5 and the type of a vehicle equipped therewith. Also, the width of the fourth block 514 in the tire radial direction and a distance La thereof from the end of the circumferential recess 500 is also set to be within a proper range depending on the size of the pneumatic tire 5 and the type of the vehicle equipped therewith.

In the example shown in FIGS. 13(a) and 13(b), two first blocks 511 and two second blocks 512 are formed between the third blocks 513. However, the number of the first blocks 511 and the second blocks 512 can be appropriately adjusted.

In the pneumatic tire 5 according to this embodiment, the fourth block 514 is formed. According to the pneumatic tire 5, turbulence generated by the first blocks 511 or the second blocks 512 passes over the fourth block 514 and then flows into the circumferential recess 500X or 500Y adjacent in the tire radial direction. Thus, the air entering into the circumferential recess 500 is likely to flow as turbulence not only in the tire circumferential direction but also in the tire radial direction. As a result, heat release is likely to be facilitated with the circumferential recess 500 as a starting point, and an increase in temperature of the bead section 30 can be suppressed.

Figure 14:
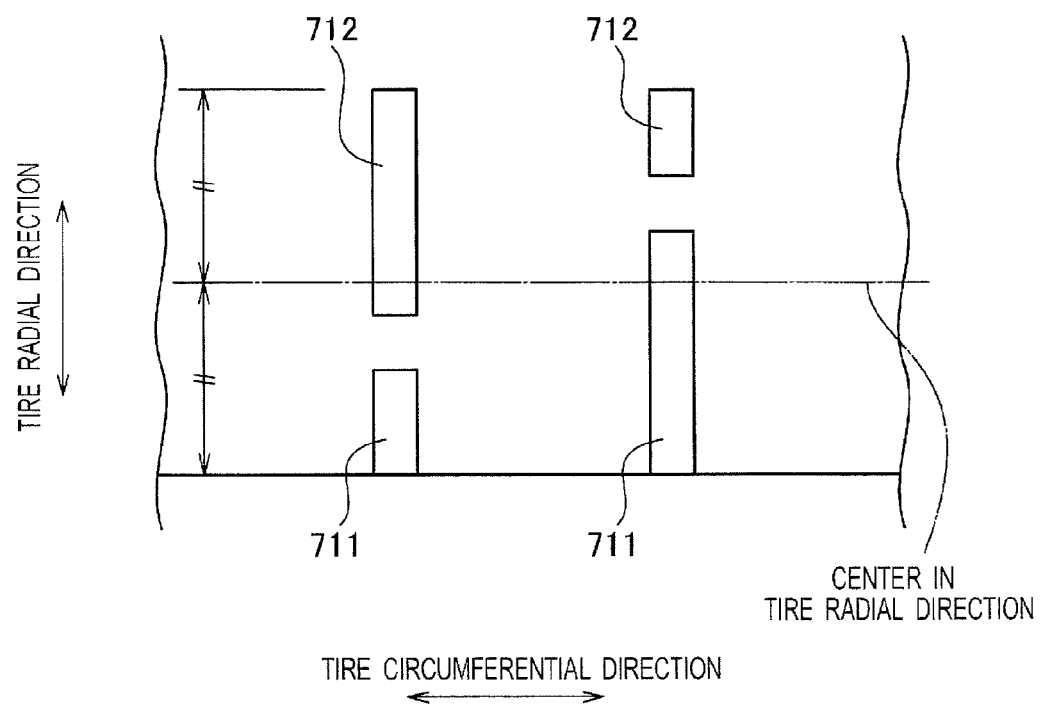
FIG. 14 is a partially enlarged plan view of a circumferential recess according to another embodiment.

As in the case of a pneumatic tire shown in FIG. 14, for example, a length of a first block 711 in the tire radial direction and a length of a second block 712 in the tire radial direction may be alternately changed. Thus, the flow of air flowing between the first block 711 and the second block 712 hits against the first block 711 or the second block 712. Therefore, turbulence is more likely to be generated. As a result, an increase in temperature of the bead section 30 can be further suppressed.

Figure 15:
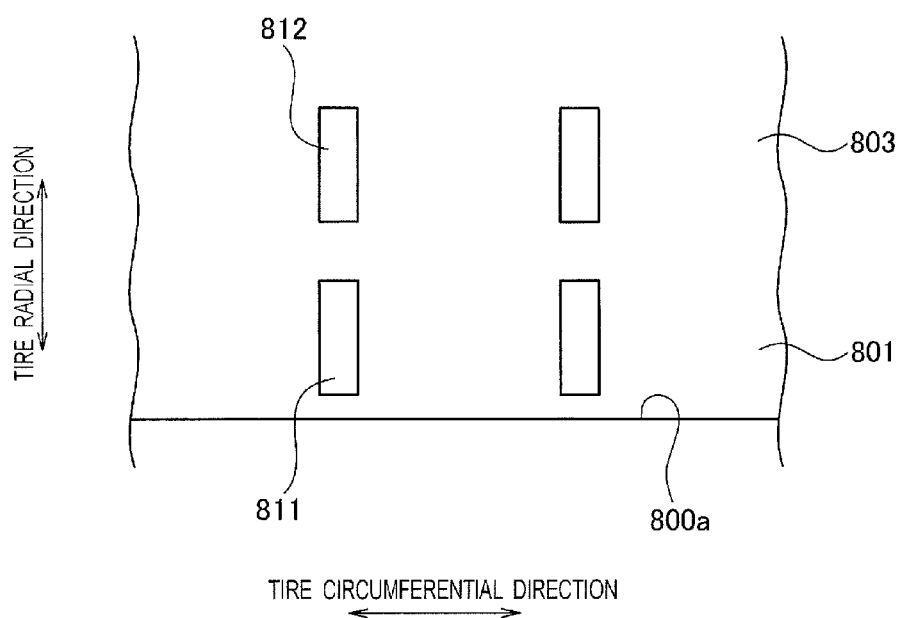
FIG. 15 is a partially enlarged plan view of a circumferential recess according to another embodiment.

As shown in FIG. 15, for example, an inner end of a first block 811 in the tire radial direction may be separated from an inner end 800a of a circumferential recess in the tire radial direction. Thus, an airflow is generated between the first block 811 and the inner end 800a of the circumferential recess in the tire radial direction. Therefore, turbulence is more likely to be generated. As a result, an increase in temperature of the bead section 30 can be further suppressed.

Figure 16:
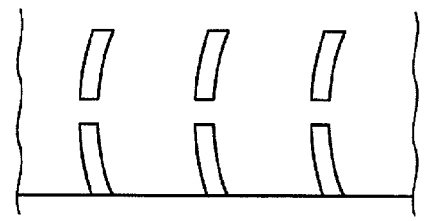
FIGS. 16(a) to 16(e) are partially enlarged plan views of circumferential recesses according to other embodiments.
Figure 16:
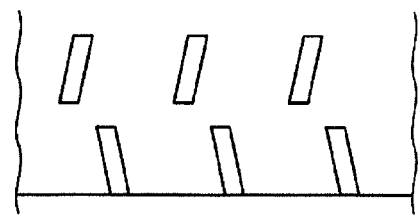
Figure 16:
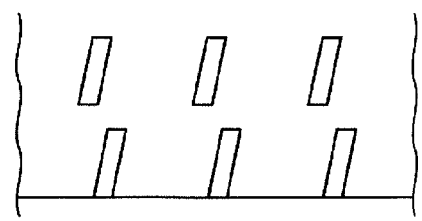
Figure 16:
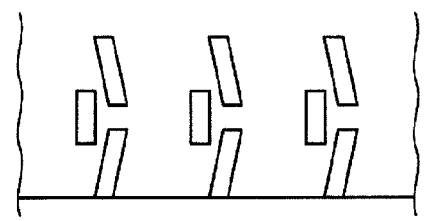
Figure 16:
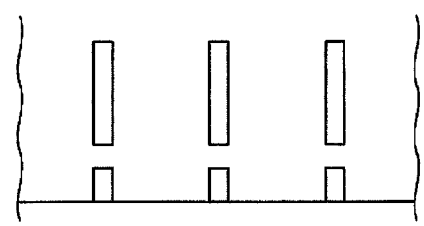

Alternatively, the embodiments of the present invention, for example, may be changed as shown in FIGS. 16(a) to 16(e). FIGS. 16(a) to 16(e) are partially enlarged plan views of circumferential recesses according to other embodiments. More specifically, as shown in FIG. 16(a), first and second blocks formed in a circumferential recess may have a curved shape in the tire circumferential direction rather than a linear shape in the tire radial direction. Alternatively, as shown in FIGS. 16(b) to 16(d), first and second blocks may be sloped in the tire circumferential direction. Furthermore, as shown in FIG. 16(e), first and second blocks may differ in length in the tire radial direction.

An inner tip of a first block may be perpendicular to a bottom surface of a circumferential recess, and an outer tip of a second block may be perpendicular to the bottom surface of the circumferential recess. However, the present invention is not limited thereto. Specifically, an angle formed by the inner tip of the first block and the bottom surface of the circumferential recess may be 90 degrees, and an angle formed by the outer tip of the second block and the bottom surface of the circumferential recess may be 90 degrees or other angles.

The tire may be a pneumatic tire filled with air, nitrogen gas or the like, or may be a solid tire filled with no air, nitrogen gas or the like.

As described above, the pneumatic tire 1 according to the embodiment is the heavy load pneumatic tire mounted on a construction vehicle such as a dump truck (e.g., an off-the-road radial (ORR) tire and a truck bus radial (TBR) tire). When a tire outside diameter is represented by "OD" and a rubber gauge of the tread section 10 in the tire equator line CL is represented by "DC", for example, it is preferable that the pneumatic tire 1 according to the embodiment has features that DC/OD≥0.015 is satisfied and a bead core width (core width) of the bead section 30 in the tread width direction Tw is 55 mm or more.

Moreover, the respective features of the embodiments and modified examples described above can be combined without impairing the invention. Note that, in the respective embodiments and modified examples, detailed description of the same configurations is omitted as appropriate.

As described above, the present invention includes various embodiments and the like which are not described herein, as a matter of course. Therefore, a technological scope of the present invention is defined only by items specific to the invention according to claims pertinent based on the foregoing description.

Note that the entire contents of Japanese Patent Application No. 2012-015463 (filed on Jan. 27, 2012) are incorporated herein by reference.

INDUSTRIAL APPLICABILITY

According to the features of the present invention, there can be provided a tire capable of suppressing an increase in temperature of the rubber in a tire side section, particularly, on a bead section side while reducing production cost.

The invention claimed is:

1. A tire comprising a tread section coming into contact with a road surface and a tire side section continuous with the tread section, wherein:

a single annular circumferential recess is formed on an outer surface of the tire side section, the circumferential recess being depressed inward in a tread width direction and extending in a tire circumferential direction, a block protruding outward in the tread width direction is formed on the inside of the circumferential recess, in a cross section along the tread width direction of the tire and a tire radial direction, a rim outer surface is formed in an area from a rim separation point, which is the outermost point in the tire radial direction that is in contact with a rim flange, to an inner end of the circumferential recess in the tire radial direction, at least a part of the block protrudes further to the outside in the tread width direction than a virtual line along which the rim-side outer surface extends, and a height of the circumferential recess in the tire radial direction is greater than that of the block in the tire radial direction, the block includes a plurality of blocks formed at predetermined intervals in the tire circumferential direction, the circumferential recess extends continuously in the tire circumferential direction and is depressed inward in the tread width direction than the virtual line extending from the rim-side outer surface, and when the plurality of blocks include a first block and a second block formed on the outer side in the tire radial direction than the first block, only the first block protrudes further to the outside in the tread width direction than the virtual line.

2. The tire according to claim 1, wherein
a protrusion height of the block with respect to the virtual line in the tread width direction is within a range of 1 to 25 mm.

3. The tire according to claim 1, wherein
the rim-side outer surface is formed along a predetermined arc curve having a center of a curvature radius on the inside in the tread width direction, and
the virtual line is a line drawn to extend the predetermined arc curve to the circumferential recess.

4. The tire according claim 3, wherein
in the cross section along the tread width direction of the tire and the tire radial direction, a sidewall surface formed in a range from the inner end of the circumferential recess in the tire radial direction to a bottom surface of the circumferential recess is formed along another arc curve having a center of a curvature radius on the outside in the tread width direction, and
when a tire height in the tire radial direction in a no-load state with a normal inner pressure and no load applied is H, the sidewall surface in a normal-load state with the normal inner pressure and a normal load applied is positioned within a range of 25% or less of the tire height H from the rim separation point to the outside in the tire radial direction.

5. The tire according to claim 4, wherein
the maximum depth of the sidewall surface with respect to the virtual line is 15 mm or more and 35 mm or less.

6. The tire according to claim 4, wherein the sidewall surface is an inner wall surface.

7. The tire according to claim 1, wherein
a curvature radius of the sidewall surface in the cross section along the tread width direction of the tire and the tire radial direction is 50 mm or more in a no-load state with a normal inner pressure and no load applied.

8. The tire according to claim 1, wherein
at least a part of the block is disposed within the sidewall surface.

9. The tire according to claim 1, wherein
a curvature radius Ra of the sidewall surface in a no-load state with a normal inner pressure and no load applied and a curvature radius Rb of the sidewall surface in a normal-load state with the normal inner pressure and a normal load applied satisfy a relationship of $(Ra-Rb)/Ra \leq 0.5$.

10. The tire according to claim 1, wherein
a plurality of the blocks are arranged at a predetermined pitch in the tire circumferential direction, and
each adjacent two of the blocks differ in position in the tire radial direction.

11. The tire according to claim 1, wherein
a height h of the block in the tread width direction is 3 mm or more and 25 mm or less.

12. The tire according to claim 1, wherein
a width w of the block in the tire circumferential direction is 2 mm or more and 10 mm or less.

13. The tire according to claim 1, wherein
relationships among a height h, a predetermined pitch p in the tire circumferential direction, and a width w, of a plurality of the blocks satisfy $1 \leq p/h \leq 50$ and $1 \leq (p-w)/w \leq 100$.

14. The tire according to claim 1, wherein an outer end of the block in the tire radial direction is disposed at a position separated from the outer end of the circumferential recess in the tire radial direction.

15. The tire according to claim 1, wherein the circumferential recess is formed in a range from the position of the tire maximum width portion to the rim separation point.

16. A tire comprising a tread section coming into contact with a road surface and a tire side section continuous with the tread section, wherein:
a single annular circumferential recess is formed on an outer surface of the tire side section, the circumferential recess being depressed inward in a tread width direction and extending in a tire circumferential direction,
a block protruding outward in the tread width direction is formed on the inside of the circumferential recess,
in a cross section along the tread width direction of the tire and a tire radial direction, a rim outer surface is formed in an area from a rim separation point, which is the outermost point in the tire radial direction that is in contact with a rim flange, to an inner end of the circumferential recess in the tire radial direction,
at least a part of the block protrudes further to the outside in the tread width direction than a virtual line along which the rim-side outer surface extends,
a height of the circumferential recess in the tire radial direction is greater than that of the block in the tire radial direction, and
an inner end of the block in the tire radial direction is positioned at the inner end of the circumferential recess in the tire radial direction.

* * * * *